United States Patent
Fukushima et al.

(10) Patent No.: US 11,482,731 B2
(45) Date of Patent: Oct. 25, 2022

(54) ELECTROLYTIC SOLUTION, BATTERY, BATTERY PACK, ELECTRONIC DEVICE, ELECTRIC VEHICLE, ELECTRICITY STORAGE DEVICE AND ELECTRIC POWER SYSTEM

(71) Applicant: Murata Manufacturing Co., Ltd., Kyoto (JP)

(72) Inventors: Kazuaki Fukushima, Kanagawa (JP); Kazumasa Takeshi, Kanagawa (JP); Tadahiko Kubota, Kanagawa (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 347 days.

(21) Appl. No.: 15/306,519

(22) PCT Filed: Apr. 10, 2015

(86) PCT No.: PCT/JP2015/002030
§ 371 (c)(1),
(2) Date: Oct. 25, 2016

(87) PCT Pub. No.: WO2015/166636
PCT Pub. Date: Nov. 5, 2015

(65) Prior Publication Data
US 2017/0054180 A1    Feb. 23, 2017

(30) Foreign Application Priority Data
May 2, 2014 (JP) .............................. JP2014-095184

(51) Int. Cl.
*H01M 10/0569* (2010.01)
*H01M 10/0566* (2010.01)
(Continued)

(52) U.S. Cl.
CPC ......... *H01M 10/0569* (2013.01); *H01M 4/38* (2013.01); *H01M 4/5815* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 2002/0045101 A1* | 4/2002 | Hwang | H01M 4/5815 429/324 |
| 2012/0082872 A1* | 4/2012 | Schmidt | H01M 10/0525 429/50 |

(Continued)

FOREIGN PATENT DOCUMENTS

| | | | | |
|---|---|---|---|---|
| JP | 2012-109223 A | | 6/2012 | |
| JP | WO 2013/062056 | * | 5/2013 | .......... H01M 10/052 |

(Continued)

OTHER PUBLICATIONS

Office Action for JP Patent Application No. 2016-515850, dated Sep. 4, 2018, 02 pages of Office Action and 02 pages of translation.

(Continued)

*Primary Examiner* — Yoshitoshi Takeuchi
(74) *Attorney, Agent, or Firm* — Chip Law Group

(57) ABSTRACT

A battery includes a positive electrode containing sulfur, a negative electrode containing a material for occluding and releasing a lithium ion, and an electrolytic solution. The electrolytic solution contains at least one of a liquid complex and a liquid salt in which a polysulfide is insoluble or almost insoluble, and a solvent in which a polysulfide is soluble. The electrolytic solution has a $Li_2S_8$ saturation sulfur concentration of 10 mM or more and 400 mM or less.

8 Claims, 9 Drawing Sheets

(51) Int. Cl.
    *H01M 10/0564*    (2010.01)
    *H01M 10/0525*    (2010.01)
    *H01M 10/052*     (2010.01)
    *H01M 4/136*      (2010.01)
    *H01M 4/38*       (2006.01)
    *H01M 10/0568*    (2010.01)
    *H01M 4/58*       (2010.01)
    *H01M 10/0567*    (2010.01)

(52) U.S. Cl.
    CPC ..... *H01M 10/052* (2013.01); *H01M 10/0525* (2013.01); *H01M 10/0567* (2013.01); *H01M 10/0568* (2013.01); *H01M 2220/10* (2013.01); *H01M 2220/20* (2013.01); *H01M 2300/004* (2013.01); *H01M 2300/0034* (2013.01); *H01M 2300/0037* (2013.01); *Y02E 60/10* (2013.01); *Y02T 10/70* (2013.01)

(56) References Cited

U.S. PATENT DOCUMENTS

| | | | | |
|---|---|---|---|---|
| 2012/0214043 | A1* | 8/2012 | Olschimke | H01M 4/381 |
| | | | | 429/144 |
| 2014/0023936 | A1* | 1/2014 | Belharouak | H01M 4/5815 |
| | | | | 429/335 |
| 2014/0220453 | A1* | 8/2014 | Barchasz | H01M 4/669 |
| | | | | 429/303 |
| 2014/0255796 | A1* | 9/2014 | Matsuoka | H01M 10/446 |
| | | | | 429/339 |
| 2015/0072248 | A1* | 3/2015 | Watanabe | H01M 4/38 |
| | | | | 429/336 |
| 2015/0118535 | A1* | 4/2015 | Smith | H01M 10/0565 |
| | | | | 429/101 |

FOREIGN PATENT DOCUMENTS

| | | | | |
|---|---|---|---|---|
| JP | 2014-017111 A | | 1/2014 | |
| JP | 2014-112526 A | | 6/2014 | |
| JP | 2005-158313 A | | 6/2015 | |
| JP | 2015-118749 A | | 6/2015 | |
| KR | 10-2012-0101414 A | | 9/2012 | |
| TW | 2013/42694 | * | 10/2013 | ........ H01M 10/0567 |
| WO | 2013/030321 A | | 3/2013 | |
| WO | 2013/030321 A1 | | 3/2013 | |
| WO | WO-2013030321 A | * | 3/2013 | ............ H01M 4/661 |
| WO | 2013/141195 A1 | | 9/2013 | |
| WO | WO 2013/141195 | * | 9/2013 | ........... H01M 10/052 |

OTHER PUBLICATIONS

Office Action for KR Patent Application No. 10-2016-7029443, dated Nov. 28, 2019, 10 pages of Office Action and 08 pages of English Translation.

Office Action for JP Patent Application No. 2016-515850, dated May 14, 2019, 02 pages of Office Action and 02 pages of English Translation.

\* cited by examiner

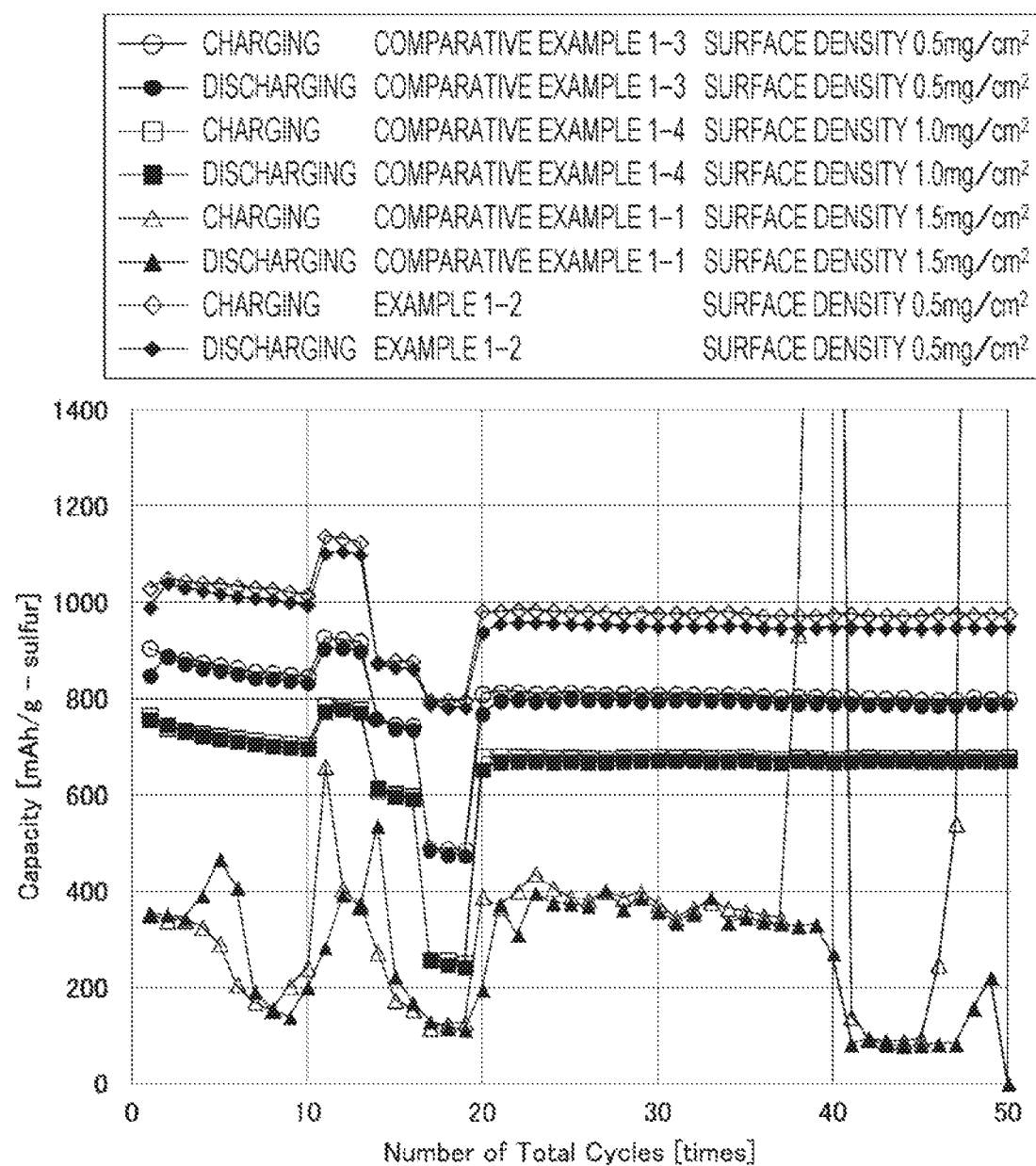

ELECTROLYTIC SOLUTION, BATTERY, BATTERY PACK, ELECTRONIC DEVICE, ELECTRIC VEHICLE, ELECTRICITY STORAGE DEVICE AND ELECTRIC POWER SYSTEM

CROSS REFERENCE TO RELATED APPLICATIONS

This application is a U.S. National Phase of International Patent Application No. PCT/JP2015/002030 filed on Apr. 10, 2015, which claims priority benefit of Japanese Patent Application No. JP 2014-095184 filed in the Japan Patent Office on May 2, 2014. Each of the above-referenced applications is hereby incorporated herein by reference in its entirety.

TECHNICAL FIELD

The present technology relates to an electrolytic solution, a battery, a battery pack, an electronic device, an electric vehicle, an electricity storage device, and an electric power system. Specifically, the present technology relates to a battery including a positive electrode containing sulfur.

BACKGROUND ART

As a secondary battery which is expected to improve electricity storage performance more largely than a lithium ion battery, a lithium sulfur battery using sulfur as a positive electrode active material is attracting attention. In a general lithium sulfur battery, sulfur is used for a positive electrode, lithium metal is used for a negative electrode, and a non-aqueous electrolytic solution containing a lithium ion ($Li^+$) is used for an electrolytic solution. Many currently-proposed lithium sulfur batteries are so-called catholyte type batteries which act while a sulfur positive electrode active material is dissolved in an electrolytic solution.

However, in the catholyte type lithium sulfur battery, sulfur contained in a positive electrode reacts with a lithium ion in an electrolytic solution during charge-discharge to be gradually eluted into the electrolytic solution as a polysulfide ($Li_2S_x$), and therefore redox shuttle occurs and cycle stability is poor disadvantageously.

Therefore, a technology for suppressing elution of sulfur contained in a positive electrode into an electrolytic solution has been studied. For example, Patent Document 1 has proposed a non-catholyte type lithium sulfur battery for suppressing elution of a polysulfide ($Li_2S_x$) by using an electrolytic solution in which glyme and an alkali metal salt form a complex.

CITATION LIST

Patent Document

Patent Document 1: JP 2012-109223 A

SUMMARY OF THE INVENTION

Problems to be Solved by the Invention

However, use of the above electrolytic solution may reduce a reaction between sulfur contained in a positive electrode and a lithium ion in the electrolytic solution, may reduce a capacity, and may make cycle characteristics unstable. Particularly, use of a positive electrode having a high surface density reduces these characteristics significantly.

Therefore, an object of the present technology is to provide an electrolytic solution having a high capacity and capable of obtaining cycle stability, a battery including the electrolytic solution, and a battery pack, an electronic device, an electric vehicle, an electricity storage device, and an electric power system including the battery.

Solutions to Problems

In order to solve the above problems, a first technology is a battery including:
a positive electrode containing sulfur;
a negative electrode containing a material for occluding and releasing a lithium ion; and
an electrolytic solution, in which
the electrolytic solution contains:
at least one of a liquid complex and a liquid salt in which a polysulfide is insoluble or almost insoluble; and
a solvent in which a polysulfide is soluble, and
the electrolytic solution has a $Li_2S_8$ saturation sulfur concentration of 10 mM or more and 400 mM or less.

A second technology is an electrolytic solution containing:
at least one of a liquid complex and a liquid salt in which a polysulfide is insoluble or almost insoluble; and
a solvent in which a polysulfide is soluble, in which the electrolytic solution has a $Li_2S_8$ saturation sulfur concentration of 10 mM or more and 400 mM or less.

A third technology is a battery pack including a battery including:
a positive electrode containing sulfur;
a negative electrode containing a material for occluding and releasing a lithium ion; and
an electrolytic solution, in which
the electrolytic solution contains:
at least one of a liquid complex and a liquid salt in which a polysulfide is insoluble or almost insoluble; and
a solvent in which a polysulfide is soluble, and
the electrolytic solution has a $Li_2S_8$ saturation sulfur concentration of 10 mM or more and 400 mM or less.

A fourth technology is an electronic device including a battery including:
a positive electrode containing sulfur:
a negative electrode containing a material for occluding and releasing a lithium ion; and
an electrolytic solution, in which
the electrolytic solution contains:
at least one of a liquid complex and a liquid salt in which a polysulfide is insoluble or almost insoluble; and
a solvent in which a polysulfide is soluble,
the electrolytic solution has a $Li_2S_8$ saturation sulfur concentration of 10 mM or more and 400 mM or less, and
the electronic device receives electric power from the battery.

A fifth technology is an electric vehicle including:
a battery;
a converter for converting electric power supplied from the battery into a driving force of the vehicle; and a control device for performing information processing on vehicle control on the basis of information on the battery, in which the battery includes:
a positive electrode containing sulfur;
a negative electrode containing a material for occluding and releasing a lithium ion; and
an electrolytic solution,
the electrolytic solution contains:
at least one of a liquid complex and a liquid salt in which a polysulfide is insoluble or almost insoluble; and
a solvent in which a polysulfide is soluble, and
the electrolytic solution has a $Li_2S_8$ saturation sulfur concentration of 10 mM or more and 400 mM or less.

In this electric vehicle, the converter typically receives electric power from a secondary battery to rotate a motor and generate a driving force. This motor can also use regenerative energy. In addition, for example, the control device performs information processing on vehicle control on the basis of a battery remaining amount of a secondary battery. Examples of this electric vehicle include a so-called hybrid car in addition to an electric car, an electric motorcycle, an electric bicycle, a railway vehicle, and the like.

A sixth technology is an electricity storage device including a battery including:
a positive electrode containing sulfur;
a negative electrode containing a material for occluding and releasing a lithium ion; and
an electrolytic solution, in which
the electrolytic solution contains:
at least one of a liquid complex and a liquid salt in which a polysulfide is insoluble or almost insoluble; and
a solvent in which a polysulfide is soluble,
the electrolytic solution has a $Li_2S_8$ saturation sulfur concentration of 10 mM or more and 400 mM or less, and
the electricity storage device supplies electric power to an electronic device connected to the battery.

This electricity storage device can be basically used for any electric power system or electric power device regardless of application of the electricity storage device, but can be used for a smart grid, for example.

A seventh technology is an electric power system including a battery including:
a positive electrode containing sulfur;
a negative electrode containing a material for occluding and releasing a lithium ion; and
an electrolytic solution, in which
the electrolytic solution contains:
at least one of a liquid complex and a liquid salt in which a polysulfide is insoluble or almost insoluble; and
a solvent in which a polysulfide is soluble,
the electrolytic solution has a $Li_2S_8$ saturation sulfur concentration of 10 mM or more and 400 mM or less, and
the electric power system receives electric power from the battery or electric power is supplied from a power generating device or an electric power network to the battery.

This electric power system may be any system as long as using electric power, and includes a simple electric power device. Examples of this electric power system include a smart grid, a home energy management system (HEMS), and a vehicle. The electric power system can also store electricity.

Effects of the Invention

As described above, according to the present technology, a high capacity and cycle stability are obtained.

BRIEF DESCRIPTION OF DRAWINGS

FIGS. 8A and 9B are diagrams illustrating cycle characteristics of coin cells in Example 1-4 and Comparative Example 1-2, respectively.

FIG. 10 is a diagram illustrating cycle characteristics of coin cells in Example 1-2 and Comparative Examples 1-1, 1-3, and 1-4.

MODE FOR CARRYING OUT THE INVENTION

Embodiments of the present technology will be described in the following order.
1. First Embodiment (example of cylinder type battery)
2. Second Embodiment (example of flat type battery)
3. Third embodiment (examples of battery pack and electronic device)
4. Fourth Embodiment (example of electricity storage system)
5. Fifth Embodiment (example of electric vehicle)

1. First Embodiment

[Configuration of Battery]

Figure 1:
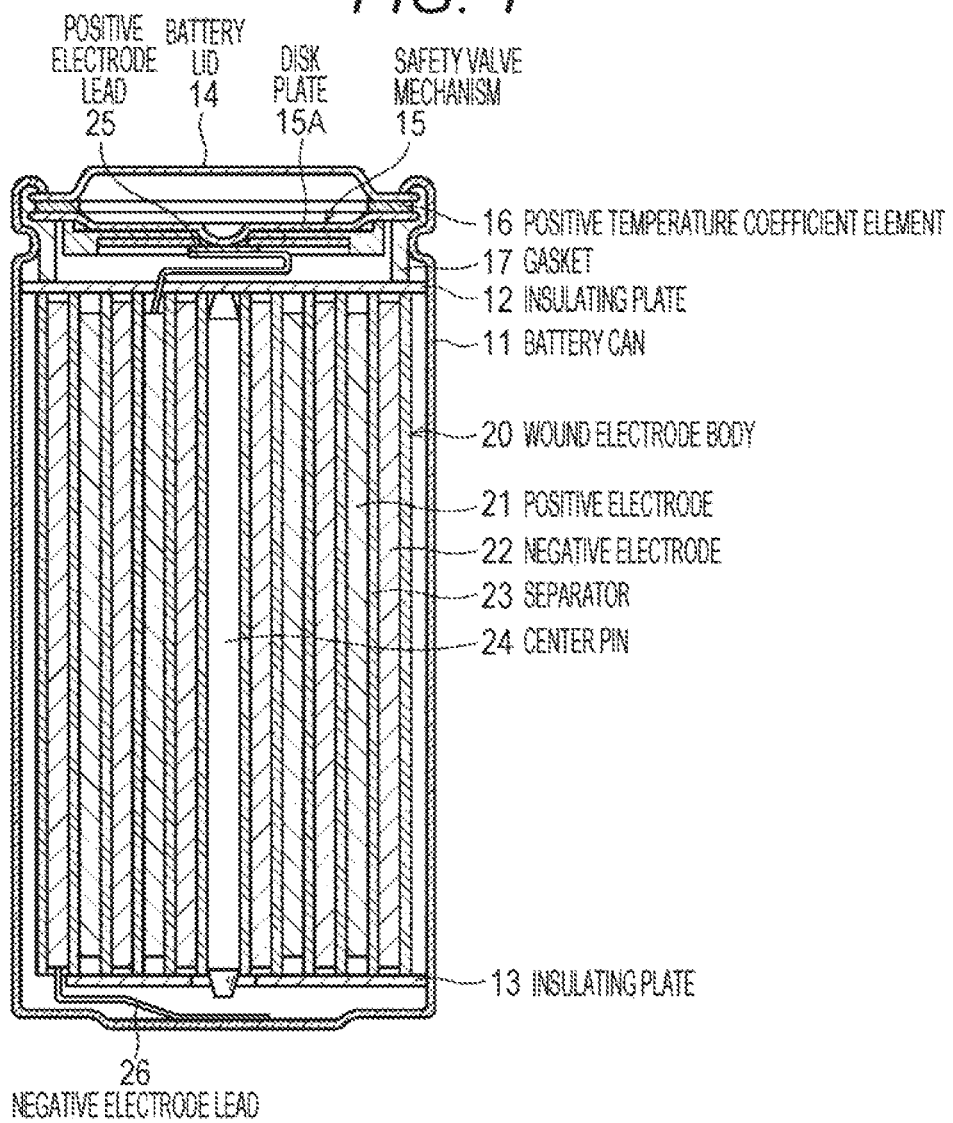
FIG. 1 is a cross sectional view illustrating one structural example of a secondary battery according to a first embodiment of the present technology.

FIG. 1 is a cross sectional view illustrating one structural example of a secondary battery according to a first embodiment of the present technology. This secondary battery is a nonaqueous electrolyte secondary battery, more specifically a lithium sulfur battery. This secondary battery is a so-called cylinder type battery, and includes a wound electrode body 20 obtained by stacking a pair of strip-shaped positive electrode 21 and strip-shaped negative electrode 22 through a separator 23 and winding the resulting stacked body in an approximately hollow cylinder-shaped battery can 11. The battery can 11 is formed of nickel (Ni)-plated iron (Fe), and a first end thereof is closed and a second end thereof is open. An electrolytic solution is injected into the battery can 11, and the separator 23 is impregnated therewith. In addition, a pair of insulating plates 12 and 13 is disposed perpendicularly to a winding peripheral surface so as to sandwich the wound electrode body 20.

A battery lid 14, a safety valve mechanism 15 disposed inside the battery lid 14, and a positive temperature coefficient element (PTC element) 16 are attached to the open end of the battery can 11 by being caulked through a sealing gasket 17. This seals an inside of the battery can 11. For example, the battery lid 14 is formed of a material similar to the battery can 11. The safety valve mechanism 15 is electrically connected to the battery lid 14. When an internal pressure of a battery becomes a certain level or more by internal short circuit, heating from an outside, or the like, a disk plate 15A is reversed to cut an electrical connection between the battery lid 14 and the wound electrode body 20. For example, the sealing gasket 17 is formed of an insulating material, and a surface thereof is coated with asphalt.

For example, a center pin 24 is inserted into the center of the wound electrode body 20. A positive electrode lead 25 formed of aluminum (Al) or the like is connected to the positive electrode 21 of the wound electrode body 20. A negative electrode lead 26 formed of nickel or the like is connected to the negative electrode 22. The positive electrode lead 25 is electrically connected to the battery lid 14 by being welded to the safety valve mechanism 15. The negative electrode lead 26 is welded to the battery can 11 to be electrically connected thereto.

Figure 2:
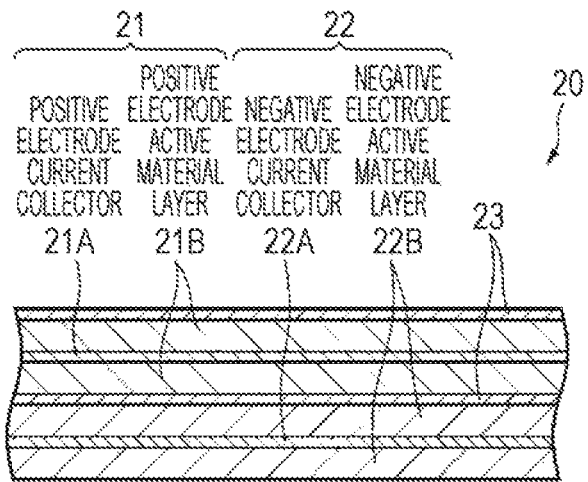
FIG. 2 is an enlarged cross sectional view of apart of a wound electrode body illustrated in FIG. 1.

FIG. 2 is an enlarged cross sectional view of a part of the wound electrode body 20 illustrated in FIG. 1. Hereinafter, the positive electrode 21, the negative electrode 22, the separator 23, and the electrolytic solution constituting a secondary battery will be sequentially described with reference to FIG. 2.

(Positive Electrode)

For example, the positive electrode 21 has a structure in which a positive electrode active material layer 21B is disposed on each surface of a positive electrode current collector 21A. Note that the positive electrode active material layer 21B may be disposed only on one surface of the positive electrode current collector 21A. For example, the positive electrode current collector 21A is formed of a metal foil such as an aluminum foil. For example, the positive electrode active material layer 21B contains sulfur as a positive electrode active material, and contains a conductive auxiliary agent and a binder, as necessary.

Examples of the conductive auxiliary agent include a carbon material such as a carbon fiber, carbon black, or a carbon nanotube. These materials can be used singly or in mixture of two or more kinds thereof. Examples of the carbon fiber include a vapor growth carbon fiber (VGCF). Examples of the carbon black include acetylene black and Ketjen black. Examples of the carbon nanotube include a single wall carbon nanotube (SWCNT) and a multi wall carbon nanotube (MWCNT) such as a double wall carbon nanotube (DWCNT). In addition, a material other than the carbon material can be used as long as the material has excellent conductivity. For example, a metal material such as Ni powder or a conductive polymer material may be used.

Examples of the binder include a fluorine-based resin such as polyvinylidene fluoride (PVdF) or polytetrafluoroethylene (PTFE), and a polymer resin such as a polyvinyl alcohol (PVA) resin or a styrene-butadiene copolymer rubber (SBR) resin. In addition, a conductive polymer may be used as the binder. Examples of the conductive polymer include a substituted or unsubstituted polyaniline, polypyrrole, polythiophene, and a (co)polymer formed of one or two kinds selected therefrom.

The positive electrode active material layer 21B preferably has a high surface density, that is, a high sulfur filling amount. The surface density of the positive electrode active material layer 21B is preferably 1.0 mg/cm$^2$ or more, and more preferably 1.5 mg/cm$^2$ or more. In a secondary battery described in Patent Document 1, use of a positive electrode active material layer having such a surface density reduces a capacity particularly significantly. On the other hand, the secondary battery according to the first embodiment can suppress such a significant reduction of a capacity. For example, the upper limit value of the surface density of the positive electrode active material layer 21B can be set to 30 mg/cm$^2$ or less, but is not particularly limited thereto.

(Negative Electrode)

The negative electrode 22 contains one or more kinds of negative electrode materials capable of occluding and releasing lithium as a negative electrode active material. The negative electrode 22 may contain a binder similar to the positive electrode active material layer 21B, as necessary.

Examples of the material for occluding and releasing a lithium ion include a metal lithium and a lithium alloy. Examples of the lithium alloy include an alloy of lithium with aluminum, silicon, tin, magnesium, indium, calcium, or the like.

(Separator)

The separator 23 isolates the positive electrode 21 and the negative electrode 22 from each other to prevent short circuit of a current due to contact between both the electrodes, and allows a lithium ion to pass therethrough. Examples of the separator 23 include a monolayer of a porous film made of a synthetic resin such as polytetrafluoroethylene, polypropylene, or polyethylene or a porous film made of ceramic, and a multilayer thereof. Particularly, as the separator 23, the porous film made of a polyolefin is preferable. This is because the porous film made of a polyolefin exhibits an excellent effect for preventing short circuit, and can improve stability of a battery due to a shutdown effect. In addition, as the separator 23, a product obtained by forming a porous resin layer such as polyvinylidene fluoride (PVdF) or polytetrafluoroethylene (PTFE) on a microporous film such as a polyolefin may be used.

(Electrolytic Solution)

The electrolytic solution contains at least one of a liquid complex and a liquid salt in which a polysulfide ($Li_2S_x$) is insoluble or almost insoluble, and a solvent in which a polysulfide is soluble (hereinafter, referred to as "soluble solvent"). The electrolytic solution preferably further contains a solvent in which a polysulfide is insoluble or almost insoluble (hereinafter, referred to as "insoluble solvent"). The electrolytic solution preferably further contains a lithium salt. Particularly, the electrolytic solution preferably further contains a lithium salt when containing a liquid salt.

The $Li_2S_8$ saturation sulfur concentration (concentration in terms of $S_8$) in the electrolytic solution is 10 mM or more and 400 mM or less, and preferably 10 mM or more and 220 mM or less. When the saturation sulfur concentration is less than 10 mM, the capacity tends to be reduced. This tendency is significant when the positive electrode 21 has a surface density as high as 1.0 mg/cm$^2$ or more. On the other hand, when the saturation sulfur concentration is more than 400 mM, redox shuttle occurs and cycle stability tends to be poor. The $Li_2S_8$ saturation sulfur concentration in the electrolytic solution is a concentration in terms of $S_8$, and can be determined by a method described in J. Phys. Chem. C 2013, 117, 4431-4440.

A volume ratio between at least one of a liquid complex and a liquid salt and a soluble solvent [(at least one of a liquid complex and a liquid salt):(soluble solvent)] is from 95:5 to 50:50, and preferably from 95:5 to 70:30. Note that the above range of the volume ratio includes numerical values 95:5, 50:50, and 70:30 as boundary values. When the volume ratio of at least one of a liquid complex and a liquid salt is more than 95, the capacity is reduced. When the volume ratio of at least one of a liquid complex and a liquid salt is less than 50, cycle stability is deteriorated. Here, the volume ratio is a ratio in an initial state of a battery.

When the electrolytic solution further contains an insoluble solvent, a volume ratio between a sum of at least one of a liquid complex and a liquid salt and an insoluble solvent and a soluble solvent [(sum of at least one of a liquid complex and a liquid salt and insoluble solvent):(soluble solvent)] is from 95:5 to 50:50, and preferably from 95:5 to 70:30. Note that the above range of the volume ratio includes numerical values 95:5, 50:50, and 70:30 as boundary values. When the volume ratio of the sum is more than 95, the capacity is reduced. When the volume ratio of the sum is less than 50, cycle stability is deteriorated. Here, the volume ratio is a ratio in an initial state of a battery.

A liquid complex and a liquid salt each have a low solubility of a polysulfide generated in the positive electrode 21, and suppress elution of the polysulfide into the electrolytic solution. The $Li_2S_8$ saturation sulfur concentration of a liquid complex and a liquid salt is preferably 10 mM or less.

The soluble solvent in which a Li salt is dissolved has a high solubility of a polysulfide generated in the positive electrode 21, and elutes the polysulfide into the electrolytic solution. The $Li_2S_8$ saturation sulfur concentration of the soluble solvent in which a lithium salt is dissolved is preferably 400 mM or more, and more preferably 400 mM or more and 1300 mM or less. Note that, by dissolving a lithium salt in a soluble solvent such as an ether solvent or a sulfone solvent, the soluble solvent has a higher solubility of a polysulfide. Therefore, the above concentration of the soluble solvent means a concentration of the soluble solvent in which a lithium salt is dissolved.

An insoluble solvent has a low solubility of a polysulfide generated in the positive electrode 21, and suppresses elution of the polysulfide into the electrolytic solution. The $Li_2S_8$ saturation sulfur concentration of an insoluble solvent is preferably 10 mM or less.

(Liquid Complex)

For example, the liquid complex is a complex of an ether compound and a lithium salt. The complex of an ether compound and a lithium salt is preferably a salt which is a liquid at room temperature and exhibits an ion conductivity. Examples of the ether compound include triglyme (G3) and tetraglyme (G4). Examples of the lithium salt include lithium bis(trifluoromethanesulfonyl) imide (LiTFSI).

Examples of the liquid complex include a glyme-lithium (Li) salt complex. Examples of the glyme-Li salt complex include at least one selected from the group consisting of a glyme-LiTFSI complex, a glyme-LiTFSA complex, and the like. Examples of the glyme-LiTFSI complex include at least one selected from the group consisting of a triglyme-LiTFSI complex ([Li(G3))[TFSI]), a tetraglyme-LiTFSI complex ([Li(G4))[TFSI]), and the like.

(Liquid Salt)

For example, the liquid salt is an ionic liquid. Lithium is preferably dissolved in the ionic liquid. Examples of the ionic liquid include an ionic liquid having a melting point of 100° C. or lower, such as a pyrrolidinium ionic liquid, a piperidinium ionic liquid, a quaternary ammonium ionic liquid, a quaternary phosphonium ionic liquid, or a dimethyl imidazolium ionic liquid.

Examples of the pyrrolidinium ionic liquid include N-methyl-N-propyl pyrrolidinium bis(trifluoromethanesulfonyl) amide ([P13] [TFSA]), N-methyl-N-propyl pyrrolidinium tetrafluoroborate ([P13] $BF_4$), N-methyl-N-propyl pyrrolidinium hexafluorophosphate ([P13] $PF_6$), N-methyl-N-propyl pyrrolidinium trifluoromethanesulfonate ([P13] [TfO]), N-methyl-N-propyl pyrrolidiniumbis(pentafluoroethylsulfonyl) amide ([P13] [BETI]), N-methyl-N-propylpyrrolidiniumbis(fluoro sulfonyl) amide ([P13] [FSA]), N-butyl-N-methylpyrrolidinium bis(trifluoromethanesulfonyl) amide ([P14] [TFSA]), N-butyl-N-methylpyrrolidinium tetrafluoroborate ([P14] $BF_4$), N-butyl-N-methylpyrrolidinium hexafluorophosphate ([P14] $PF_6$), N-butyl-N-methylpyrrolidinium trifluoromethanesulfonate ([P14] [TfO]), N-butyl-N-methylpyrrolidinium bis(pentafluoroethyl sulfonyl) amide ([P14] [BETI]), and N-butyl-N-methylpyrrolidinium bis(fluoro sulfonyl) amide ([P14] [FSA]).

Examples of the piperidinium ionic liquid include N-methyl-N-propyl piperidinium bis(trifluoromethanesulfonyl) amide ([PP13] [TFSA]), N-methyl-N-propyl piperidinium tetrafluoroborate ([PP13] $BF_4$), N-methyl-N-propyl piperidinium hexafluorophosphate ([PP13] $PF_6$), N-methyl-N-propyl piperidinium trifluoromethanesulfonate ([PP13] [TfO]), N-methyl-N-propyl piperidinium bis(pentafluoroethyl sulfonyl) amide ([PP13] [BETI]), N-methyl-N-propyl piperidinium bis(fluoro sulfonyl) amide ([PP13] [FSA]), N-butyl-N-methylpiperidinium tetrafluoroborate ([PP14] $BF_4$), N-butyl-N-methylpiperidinium hexafluorophosphate ([PP14] $PF_6$), N-butyl-N-methylpiperidinium trifluoromethanesulfonate ([PP14] [TfO]), N-butyl-N-methylpiperidinium bis(pentafluoroethyl sulfonyl) amide ([PP14] [BETI]), and N-butyl-N-methylpiperidinium bis(fluoro sulfonyl) amide ([PP14] [FSA]).

Examples of the quaternary ammonium ionic liquid include N,N-diethyl-N-methyl-N-(2-methoxyethyl) ammonium bis(trifluoromethanesulfonyl) amide ([DEME] [TFSA]), N,N-diethyl-N-methyl-N-(2-methoxyethyl) ammonium tetrafluoroborate ([DEME] $BF_4$), N,N-diethyl-N-methyl-N-(2-methoxyethyl) ammonium hexafluorophosphate ([DEME] $PF_6$), N,N-diethyl-N-methyl-N-(2-methoxyethyl) ammonium trifluoromethanesulfonate ([DEME] [TfO]), N,N-diethyl-N-methyl-N-(2-methoxyethyl) ammonium bis(pentafluoroethyl sulfonyl) amide ([DEME] [BETI]), N,N-diethyl-N-methyl-N-(2-methoxyethyl) ammonium bis(fluoro sulfonyl) amide ([DEME] [FSA]), N,N,N-trimethyl-N-propyl ammonium bis(trifluoromethanesulfonyl) amide ([TMPA] [TFSA]), N,N,N-trimethyl-N-propyl ammonium tetrafluoroborate ([TMPA] $BF_4$), N,N,N-trimethyl-N-methyl-N-propyl ammonium hexafluorophosphate ([TMPA] $PF_6$), N,N,N-trimethyl-N-methyl-N-propyl ammonium trifluoromethanesulfonate ([TMPA] [TfO]), N,N,N-trimethyl-N-propyl ammonium bis(pentafluoroethyl sulfonyl) amide ([TMPA] [BETI]), and N,N,N-trimethyl-N-propyl ammonium bis(fluoro sulfonyl) amide ([TMPA] [FSA]).

Examples of the quaternary phosphonium ionic liquid include triethyl-pentyl-phosphonium bis(trifluoromethanesulfonyl) amide ([P2225] [TFSA]), triethyl-pentyl-phosphonium tetrafluoroborate ([P2225] $BF_4$), triethyl-pentyl-phosphonium hexafluorophosphate ([P2225] $PF_6$), triethyl-pentyl-phosphonium trifluoromethanesulfonate ([P2225] [TfO]), triethyl-pentyl-phosphonium bis(pentafluoroethyl sulfonyl) amide ([P2225] [BETI]), and triethyl-pentyl-phosphonium bis(fluorosulfonyl) amide ([P2225] [FSA]).

Examples of the dimethyl imidazolium ionic liquid include 1-butyl-2,3-dimethyl imidazolium bis(trifluoromethanesulfonyl) amide ([C4dmim] [TFSA]), 1-butyl-2,3-dimethyl imidazolium tetrafluoroborate ([C4dmim] $BF_4$), 1-butyl-2,3-dimethyl imidazolium hexafluorophosphate ([C4dmim] $PF_6$), 1-butyl-2,3-dimethyl imidazolium trifluoromethanesulfonate ([C4dmim] [TfO]), 1-butyl-2,3-dimethyl imidazolium bis(pentafluoroethyl sulfonyl) amide ([C4dmim] [BETI]), and 1-butyl-2,3-dimethyl imidazolium bis(fluorosulfonyl) amide ([C4dmim] [FSA]).

The above ionic liquid may be used singly or in mixture of two or more kinds thereof. The electrolytic solution containing the above ionic liquid suppresses elution of sulfur (S) and a reduction product of sulfur into the electrolytic solution, hardly reduces a capacity even after repetition of a charge-discharge cycle, and can improve a coulomb efficiency. In addition, each of these ionic liquids has a thermal decomposition temperature of 350° C. or higher, and has high thermal stability. Furthermore, each of these ionic liquids has a melting point of 100° C. or lower. Therefore, a battery can act at a temperature equal to or higher than the melting point of each of the ionic liquids (preferably at room temperature), and improves safety thereof.

(Soluble Solvent)

Examples of the soluble solvent include at least one selected from the group consisting of an ether solvent and a sulfone solvent. For example, as the ether solvent, a chain ether such as 1,2-dimethoxyethane (DME), a cyclic ether such as 1,3-dioxolane (DOL), a glyme such as triglyme (G3) or tetraglyme (G4), and the like can be used singly or in mixture of two or more kinds thereof. For example, as the sulfone solvent, a chain sulfone such as ethyl methyl sulfone (EMS), a cyclic sulfone such as sulfolane (SL), and the like can be used singly or in mixture of two or more kinds thereof.

(Insoluble Solvent)

The insoluble solvent is a solvent for adjusting a viscosity of the electrolytic solution, an ionic conductivity, the amount of dissolved polysulfide, and the like. Examples of the insoluble solvent include at least one selected from the group consisting of fluorinated ether and an aromatic compound. Examples of the fluorinated ether include hydrofluoroether (HFE).

For example, the hydrofluoroether is a compound represented by Rd-O—Re (in the formula, Rd and Re are each independently an alkyl group or a fluorine-containing alkyl group, at least one of Rd and Re is a fluorine-containing alkyl group, the total number of hydrogen atoms contained in Rd and Re is one or more, and the total number of carbon atoms contained in Rd and Re is seven to ten). Examples thereof include 1H,1H,2'H,3H-decafluoro dipropyl ether (CAS number: 65064-78-0), 1,1,2,2-tetrafluoroethyl 2,2,3,3-tetrafluoropropyl ether (CAS number: 16627-68-2), 2-trifluoromethyl-3-ethoxy dodecafluoro hexane, and 1-methyl-2,2,3,4,4,4-hexafluorobutyl (1,1,2,3,3,3-hexafluoropropyl) ether.

For example, as the aromatic compound, toluene (TOL), fluorobenzene (FBz), and the like can be used singly or in mixture of two or more kinds thereof.

(Electrolyte Salt)

Examples of an electrolyte salt include a lithium salt. The lithium salt can be used singly or in mixture of two or more kinds thereof. Examples of the lithium salt include LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, and LiN(SO$_2$CF$_3$)$_2$ (LiTFSI).

Various materials other than the above materials can be added to the electrolytic solution in order to improve battery characteristics, as necessary. Examples of these materials include an imide salt, a sulfonated compound, an aromatic compound, and a halogen-substituted compound thereof.

[Action of Lithium Sulfur Battery]

During charging, a secondary battery having the above configuration converts electric energy into chemical energy by movement of a lithium ion (Li$^+$) from the positive electrode 21 to the negative electrode 22 through the electrolytic solution, and stores electricity. During discharging, the secondary battery generates electric energy by return of the lithium ion from the negative electrode 22 to the positive electrode 21 through the electrolytic solution.

[Method for Manufacturing Battery]

Next, a method for manufacturing the secondary battery according to the first embodiment of the present technology will be exemplified.

First, for example, a positive electrode active material, a conductive auxiliary agent, and a binder are mixed to prepare a positive electrode mixture, and this positive electrode mixture is dispersed in a solvent such as N-methyl-2-pyrrolidone (NMP) to manufacture a paste-like positive electrode mixture slurry. Subsequently, this positive electrode mixture slurry is applied on the positive electrode current collector 21A, the solvent is dried, and compression molding is performed with a roll press machine or the like to form the positive electrode active material layer 21B. The positive electrode 21 is thereby obtained.

Subsequently, the positive electrode lead 25 is attached to the positive electrode current collector 21A by welding or the like, and the negative electrode lead 26 is attached to the negative electrode 22 by welding or the like. Subsequently, the positive electrode 21 and the negative electrode 22 are wound through the separator 23. Subsequently, an end of the positive electrode lead 25 is welded to the safety valve mechanism 15, and an end of the negative electrode lead 26 is welded to the battery can 11. The wound positive electrode 21 and negative electrode 22 are sandwiched by the pair of insulating plates 12 and 13, and are housed in the battery can 11. Thereafter, the electrolytic solution is injected into the battery can 11, and the separator 23 is impregnated therewith. Subsequently, the battery lid 14, the safety valve mechanism 15, and the positive temperature coefficient element 16 are fixed to an open end of the battery can 11 by being caulked through the sealing gasket 17. The secondary battery illustrated in FIG. 1 is thereby obtained.

[Effect]

In the battery according to the first embodiment, the electrolytic solution contains at least one of a liquid complex and a liquid salt in which a polysulfide is insoluble or almost insoluble, and a solvent in which a polysulfide is soluble. The composition of this electrolytic solution is adjusted such that the Li$_2$S$_8$ saturation sulfur concentration (concentration in terms of S$_8$) is 10 mM or more and 400 mM or less. Therefore, a high capacity and high cycle stability are obtained.

2. Second Embodiment

[Configuration of Battery]

Figure 3:
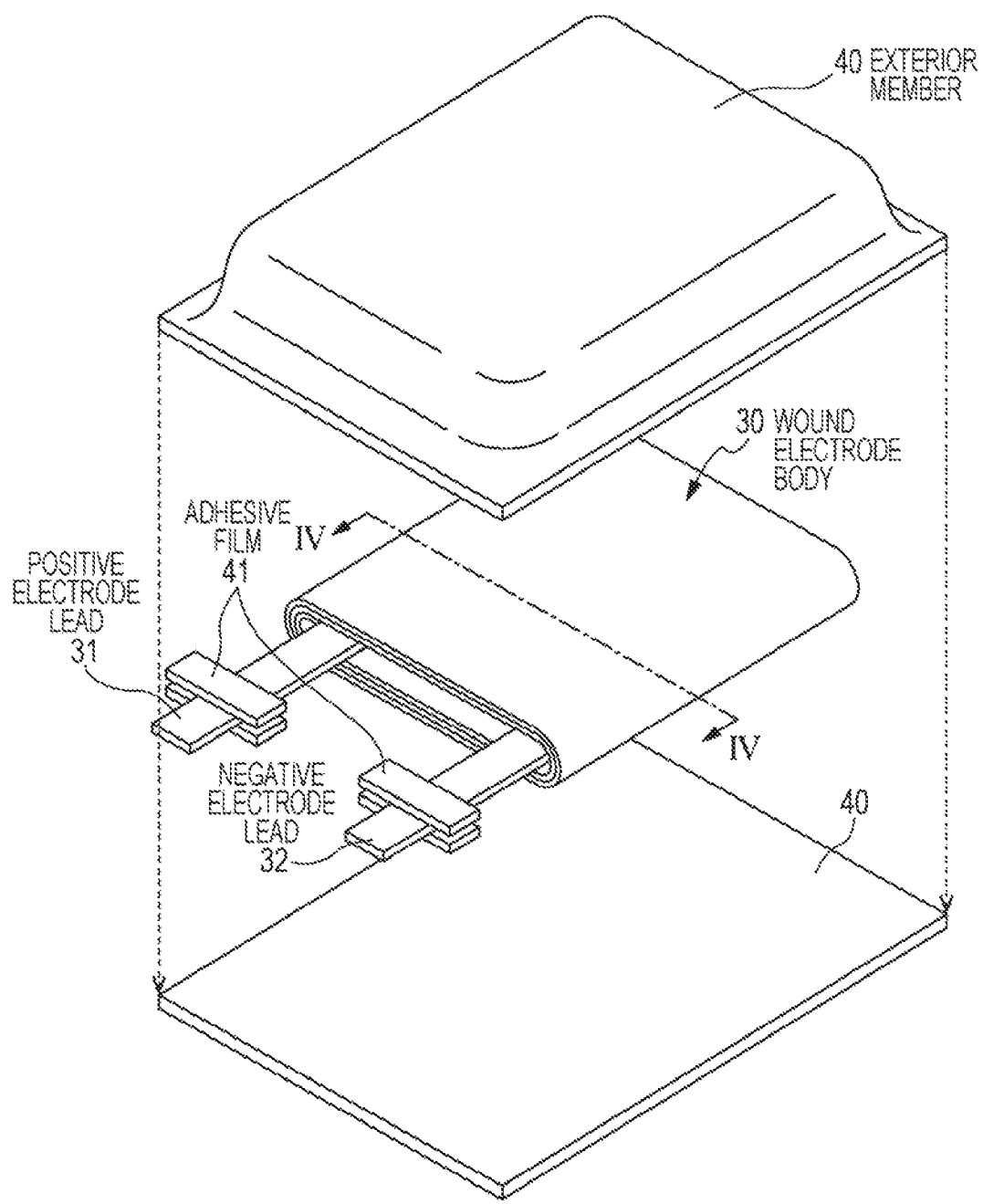
FIG. 3 is an exploded perspective view illustrating one structural example of a secondary battery according to a second embodiment of the present technology.

FIG. 3 is an exploded perspective view illustrating one structural example of a secondary battery according to a second embodiment of the present technology. This secondary battery is obtained by housing a wound electrode body 30 to which a positive electrode lead 31 and a negative electrode lead 32 have been attached in a film-like exterior member 40, and can be smaller, lighter, and thinner.

Each of the positive electrode lead 31 and the negative electrode lead 32 goes from an inside of the exterior member 40 to an outside thereof, and for example, is led out in the same direction. For example, each of the positive electrode lead 31 and the negative electrode lead 32 is formed of a metal material such as aluminum, copper, nickel, or stainless steel, and has a thin plate shape or a mesh shape.

For example, the exterior member 40 is formed of a rectangular aluminum laminated film obtained by bonding a nylon film, an aluminum foil, and a polyethylene film in this order. For example, the exterior member 40 is disposed such that a side of the polyethylene film faces the wound electrode body 30, and outer peripheral portions thereof are in close contact with each other by fusion or an adhesive. An adhesive film 41 is inserted between the exterior member 40 and each of the positive electrode lead 31 and the negative electrode lead 32 in order to prevent entrance of the outside air. The adhesive film 41 is formed of a material having adhesion to the positive electrode lead 31 and the negative electrode lead 32, for example, of a polyolefin resin such as polyethylene, polypropylene, modified polyethylene, or modified polypropylene.

Note that the exterior member 40 may be formed of a laminated film having another structure, a polymer film such as polypropylene, or a metal film in place of the above laminated film.

Figure 4:
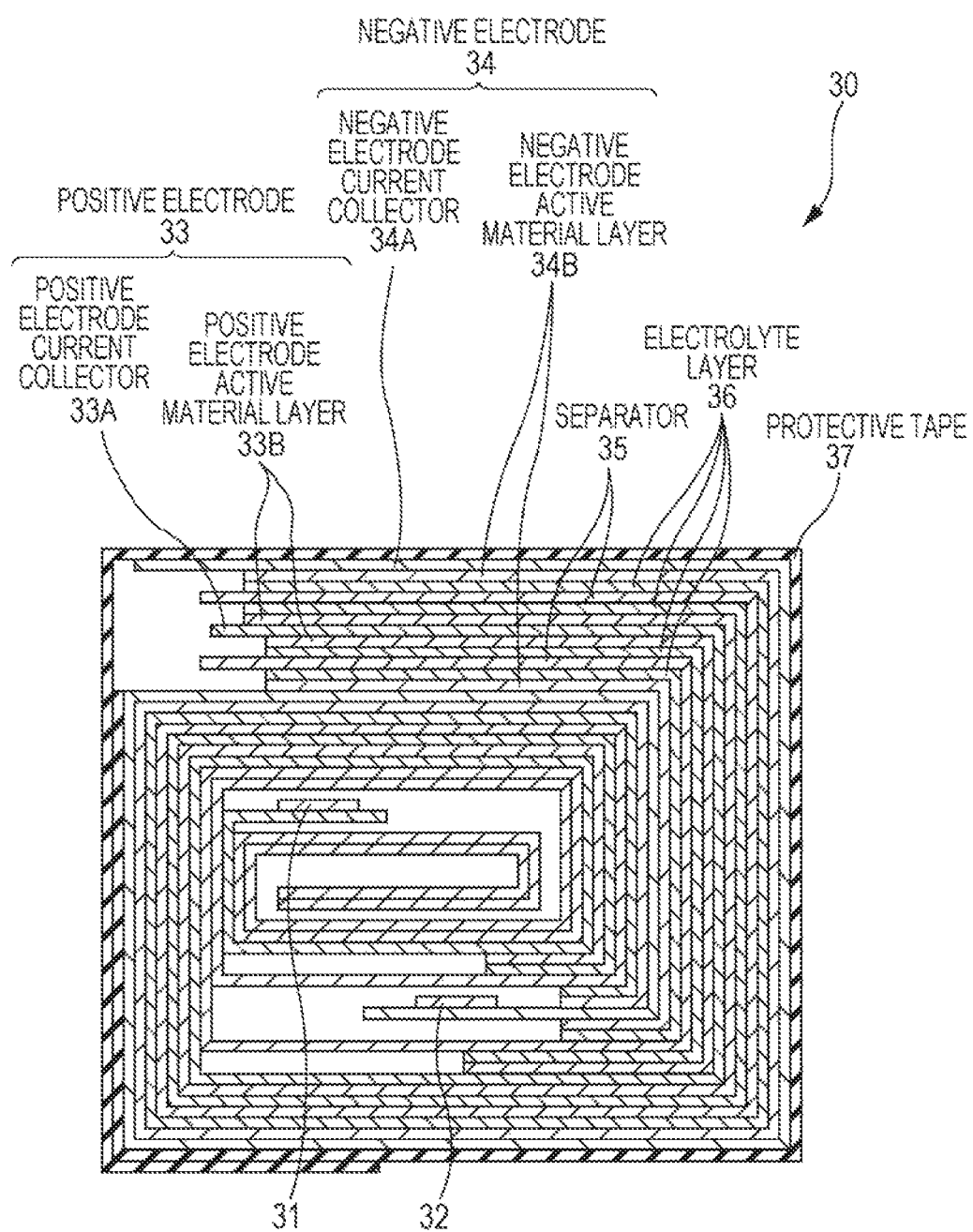
FIG. 4 is a cross sectional view of a wound electrode body cut along line IV-IV in FIG. 3.

FIG. 4 is an enlarged cross sectional view of a part of the wound electrode body illustrated in FIG. 3. The wound electrode body 30 is obtained by stacking a positive electrode 21 and a negative electrode 22 through a separator 23 and an electrolyte layer 33 and winding the resulting stacked body, and an outermost peripheral portion thereof may be protected with a protective tape (not illustrated). The electrolyte layer 33 is disposed between the positive electrode 21 and the separator 23 and between the negative electrode 22 and the separator 23. In the second embodiment, the same signs are given to portions similar to the first embodiment, and description thereof will be omitted.

The electrolyte layer 33 contains an electrolytic solution and a polymer compound serving as a holding body for holding the electrolytic solution, and is in a so-called gel state. The gel electrolyte layer 33 is preferable because the electrolyte layer 33 can obtain a high ionic conductivity and can prevent leakage of a battery. The composition of the electrolytic solution is similar to that of the secondary battery according to the first embodiment. Examples of the polymer compound include polyacrylonitrile, polyvinylidene fluoride, a copolymer of vinylidene fluoride and hexafluoropropylene, polytetrafluoroethylene, polyhexafluoropropylene, polyethylene oxide, polypropylene oxide, polyphosphazene, polysiloxane, polyvinyl acetate, polyvinyl alcohol, polymethyl methacrylate, polyacrylic acid, polymethacrylic acid, a styrene-butadiene rubber, a nitrile-butadiene rubber, polystyrene, and polycarbonate. Polyacrylonitrile, polyvinylidene fluoride, polyhexafluoropropylene, or polyethylene oxide is preferable in terms of electrochemical stability.

[Method for Manufacturing Battery]

Next, a method for manufacturing the secondary battery according to the second embodiment of the present technology will be exemplified. First, a precursor solution containing a solvent, an electrolyte salt, a polymer compound, and a mixed solvent is applied on each of the positive electrode 21 and the negative electrode 22, and the mixed solvent is volatilized to form the electrolyte layer 33. Subsequently, the positive electrode lead 31 is attached to an end of a positive electrode current collector 21A by welding, and the negative electrode lead 32 is attached to an end of the negative electrode 22 by welding. Subsequently, the positive electrode 21 and the negative electrode 22 are stacked through the separator 23 to obtain a stacked body. Thereafter, this stacked body is wound in a longitudinal direction, and a protective tape is bonded to an outermost peripheral portion thereof to form the wound electrode body 30. Finally, for example, the wound electrode body 30 is inserted into the exterior member 40, and outer peripheral portions of the exterior member 40 are in close contact with each other by thermal fusion or the like to be sealed. At this time, the adhesive film 41 is inserted between the exterior member 40 and each of the positive electrode lead 31 and the negative electrode lead 32. The secondary battery illustrated in FIG. 3 is thereby obtained.

In addition, the secondary battery according to the second embodiment of the present technology may be manufactured as follows. First, the positive electrode lead 31 and the negative electrode lead 32 are attached to the positive electrode 21 and the negative electrode 22, respectively. Subsequently, the positive electrode 21 and the negative electrode 22 are stacked through the separator 23, the resulting stacked body is wound, and a protective tape is bonded to an outermost peripheral portion thereof to form a wound body which is a precursor of the wound electrode body 30. Subsequently, this wound body is inserted into the exterior member 40, outer peripheral portions excluding one side are thermally fused to be formed into a bag shape, and the resulting product is housed in the exterior member 40. Subsequently, an electrolyte composition containing a solvent, an electrolyte salt, a monomer serving as a raw material of a polymer compound, a polymerization initiator, and another material such as a polymerization inhibitor, as necessary, is prepared, and is injected into the exterior member 40.

Subsequently, the electrolyte composition is injected into the exterior member 40, and then an opening of the exterior member 40 is thermally fused under a vacuum atmosphere to be sealed. Subsequently, the monomer is polymerized by heating to obtain a polymer compound, and the gel electrolyte layer 33 is thereby formed. The secondary battery illustrated in FIG. 3 is thereby obtained.

An action and an effect of the secondary battery according to the second embodiment are similar to those of the secondary battery according to the first embodiment.

3. Third Embodiment

In a third embodiment, a battery pack and an electronic device including the secondary battery according to the first or second embodiment will be described.

Figure 5:
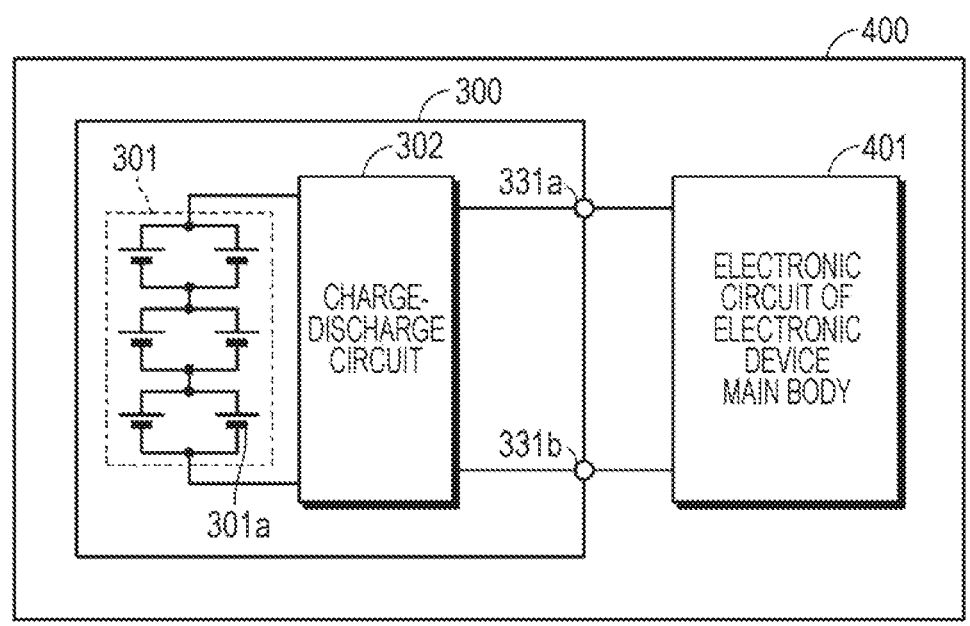
FIG. 5 is a block diagram illustrating one structural example of each of a battery pack and an electronic device according to a third embodiment of the present technology.

Hereinafter, configurations of a battery pack 300 and an electronic device 400 according to the third embodiment of the present technology will be exemplified with reference to FIG. 5. The electronic device 400 includes an electronic circuit 401 of an electronic device main body and the battery pack 300. The battery pack 300 is electrically connected to the electronic circuit 401 through a positive electrode terminal 331a and a negative electrode terminal 331b. For example, in the electronic device 400, the battery pack 300 is attachable and removable by a user. Note that the configuration of the electronic device 400 is not limited thereto, but the battery pack 300 may be incorporated in the electronic device 400 such that a user cannot remove the battery pack 300 from the electronic device 400.

During charging of the battery pack 300, the positive electrode terminal 331a of the battery pack 300 and the negative electrode terminal 331b thereof are connected to a positive electrode terminal of a charger (not illustrated) and a negative electrode terminal thereof, respectively. On the other hand, during discharging of the battery pack 300 (during use of the electronic device 400), the positive electrode terminal 331a of the battery pack 300 and the negative electrode terminal 331b thereof are connected to a positive electrode terminal of the electronic circuit 401 and a negative electrode terminal thereof, respectively.

Examples of the electronic device 400 include a notebook personal computer, a tablet computer, a mobile phone (for example, a smart phone), a personal digital assistant (PDA), an imaging device (for example, a digital still camera or a digital video camera), an audio device (for example, a portable audio player), a game device, a cordless handset phone machine, an electronic book, an electronic dictionary, a radio, a headphone, a navigation system, a memory card, a pacemaker, a hearing aid, an electric tool, an electric shaver, a refrigerator, an air conditioner, a television, a stereo, a water heater, a microwave oven, a dishwasher, a washing machine, a dryer, a lighting device, a toy, a medical device, a robot, a load conditioner, and a traffic signal. However, the electronic device 400 is not limited thereto.

(Electronic Device)

For example, the electronic circuit 401 includes CPU, a peripheral logic unit, an interface unit, and a storage unit, and controls the entire electronic device 400.

(Battery Pack)

The battery pack 300 includes an assembled battery 301 and a charge-discharge circuit 302. The assembled battery 301 is formed by connecting a plurality of secondary batteries 301a to each other in series or in parallel. For example, the plurality of secondary batteries 301a are connected to each other in n parallel m series (each of n and m is a positive integer). Note that FIG. 5 illustrates an example in which six secondary batteries 301a are connected to each other in 2 parallel 3 series (2P3S). As the secondary battery 301a, the secondary battery according to the first or second embodiment is used.

During charging, the charge-discharge circuit 302 controls charging to the assembled battery 301. On the other hand, during discharging (that is, during use of the electronic device 400), the charge-discharge circuit 302 controls discharging to the electronic device 400.

4. Fourth Embodiment

In a fourth embodiment, an electricity storage system including the secondary battery in the electricity storage device according to the first or second embodiment will be described.

[Configuration of Electricity Storage System]

Figure 6:
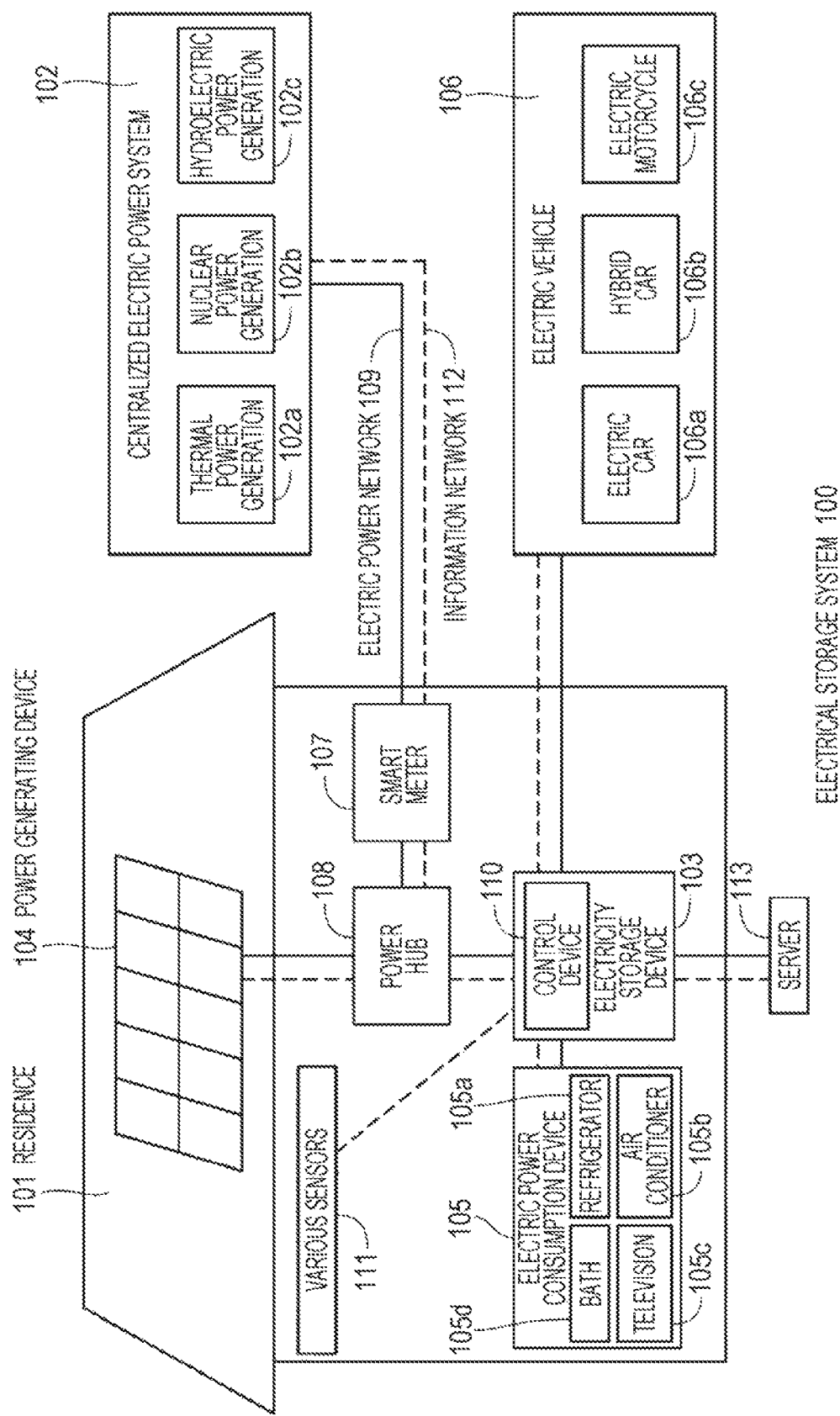
FIG. 6 is a schematic diagram illustrating one structural example of an electricity storage system according to a fourth embodiment of the present technology.

Hereinafter, a configuration of an electricity storage system (electric power system) 100 according to the fourth embodiment will be exemplified with reference to FIG. 6. The electricity storage system 100 is a residential electricity storage system, and electric power is supplied from a centralized electric power system 102 such as thermal power generation 102a, nuclear power generation 102b, or hydroelectric power generation 102c to an electricity storage device 103 via an electric power network 109, an information network 112, a smart meter 107, a power hub 108, or the like. At the same time, electric power is supplied from an independent power source such as a home power generating device 104 to the electricity storage device 103. Electric power supplied to the electricity storage device 103 is stored. Electric power used in a residence 101 is supplied using the electricity storage device 103. Not only the residence 101 but also a building can use a similar electricity storage system.

The residence 101 is provided with the home power generating device 104, an electric power consumption device 105, the electricity storage device 103, a control device 110 for controlling devices, the smart meter 107, the power hub 108, and a sensor 111 for acquiring various information. The devices are connected to each other via the electric power network 109 and the information network 112. As the home power generating device 104, a solar cell, a fuel cell, or the like is used, and generated electric power is supplied to the electric power consumption device 105 and/or the electricity storage device 103. The electric power consumption device 105 is a refrigerator 105a, an air conditioner 105b, a television receiver 105c, a bath 105d, or the like. Furthermore, the electric power consumption device 105 further includes an electric vehicle 106. The electric vehicle 106 is an electric car 106a, a hybrid car 106b, or an electric motorcycle 106c.

The electricity storage device 103 includes the secondary battery according to the first or second embodiment. The smart meter 107 measures a use amount of commercial electric power, and transmits the measured use amount to an electric power company. The electric power network 109 may be any one of DC power supply, AC power supply, and non-contact power supply, or a combination of two or more thereof.

Examples of the various sensors 111 include a human sensor, an illuminance sensor, an object detection sensor, a consumed electric power sensor, a vibration sensor, a contact sensor, a temperature sensor, and an infrared sensor. Information acquired by the various sensors 111 is transmitted to the control device 110. A weather condition, a human condition, or the like is understood due to the Information from the sensors 111, and energy consumption can be minimized by automatic control of the electric power consumption device 105. Furthermore, the control device 110 can transmit information on the residence 101 to an external electric power company or the like via internet.

The power hub 108 performs processing such as branching of an electric power line or DC-AC conversion. A communication method of the information network 112 connected to the control device 110 includes a method of using a communication interface such as universal asynchronous receiver-transceiver (UART) and a method of using a sensor network by a wireless communication standard, such as Bluetooth (registered trademark), ZigBee, or Wi-Fi. The Bluetooth (registered trademark) method is applied to multimedia communication and perform one-to-many communication. ZigBee uses a physical layer of IEEE (Institute of Electrical and Electronics Engineers) 802.15.4. IEEE802.15.4 is a name of a short-distance wireless network standard called personal area network (PAN) or wireless (W) PAN.

The control device 110 is connected to an external server 113. This server 113 may be managed by any one of the residence 101, an electric power company, and a service provider. For example, information transmitted or received by the server 113 is consumption electric power information, life pattern information, electric power charge, weather information, natural disaster information, or information about electric power transaction. A home electric power consumption device (for example, a television receiver) may transmit or receive the information, but an outside-home device (for example, a mobile phone) may transmit or receive the information. A device having a display function, such as a television receiver, a mobile phone, or a personal digital assistant (PDA), may display the information.

The control device 110 for controlling units is constituted by a central processing unit (CPU), a random access memory (RAM), a read only memory (ROM), and the like, and is housed in the electricity storage device 103 in this example. The control device 110 is connected to the electricity storage device 103, the home power generating device 104, the electric power consumption device 105, the various sensors 111, and the server 113 via the information network 112, and for example, adjusts a use amount of commercial electric power and a power generation amount. Note that the control device 110 may perform electric power transaction in an electric power market.

As described above, the electricity storage device 103 can store not only electric power from the centralized electric power system 102 such as the thermal power generation 102a, the nuclear power generation 102b, or the hydroelectric power generation 102c but also electric power generated by the home power generating device 104 (solar power generation or wind power generation). Therefore, even when the electric power generated by the home power generating device 104 fluctuates, control for keeping the amount of electric power to be sent to an outside constant or discharging by a necessary amount of electric power can be performed. For example, the following method of use is possible. That is, electric power obtained by solar power generation is stored in the electricity storage device 103, midnight electric power the charge of which is low at night is stored in the electricity storage device 103, and electric power stored in the electricity storage device 103 is used by discharging in daytime in which electric power charge is high.

Note that, in this example, the control device 110 housed in the electricity storage device 103 has been exemplified, but the control device 110 may be housed in the smart meter 107, or may be formed alone. Furthermore, the electricity storage system 100 may be used for a plurality of homes in a multiple dwelling house or a plurality of detached houses.

5. Fifth Embodiment

In a fifth embodiment, an electric vehicle including the secondary battery according to the first or second embodiment will be described.

Figure 7:
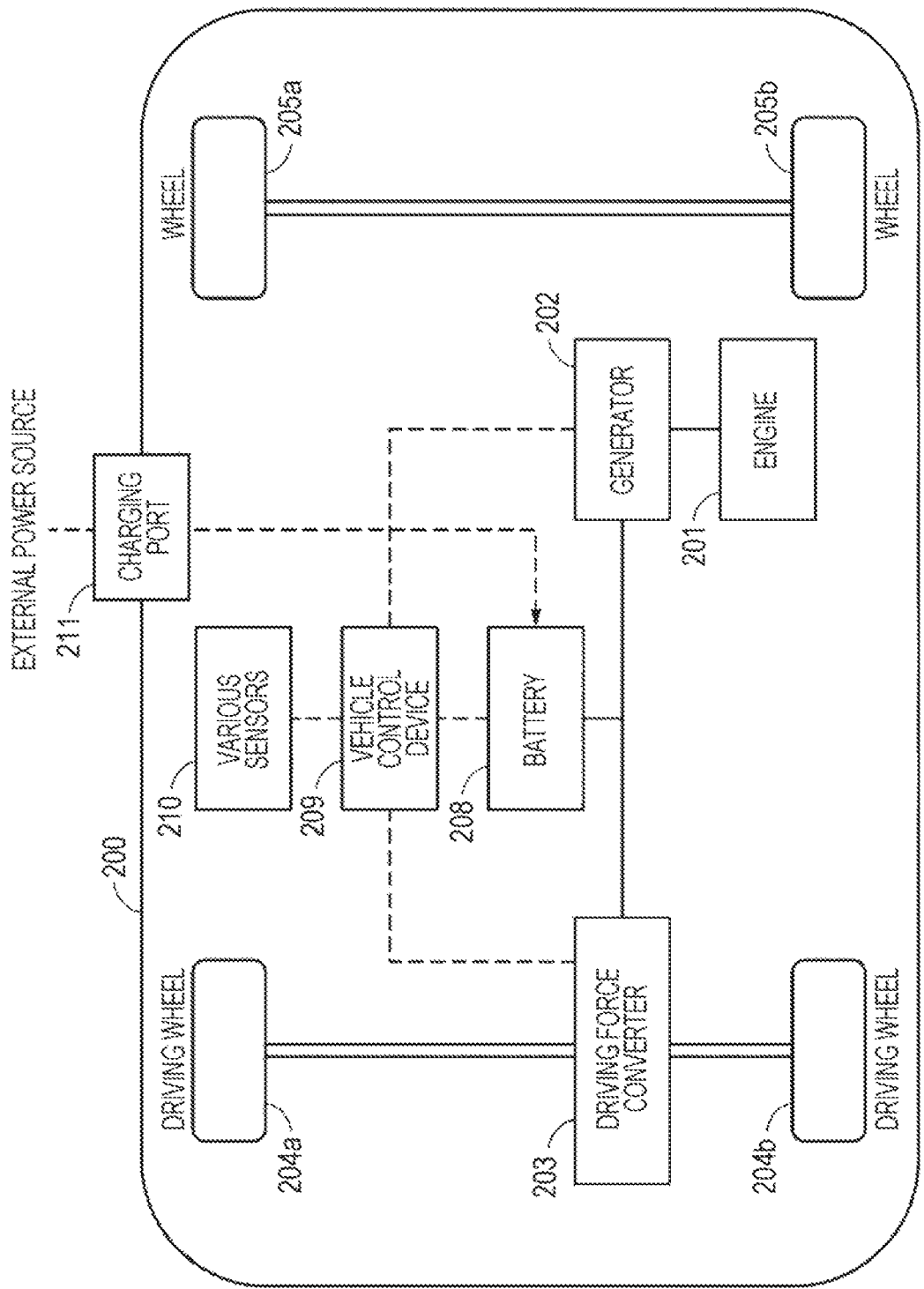
FIG. 7 is a schematic diagram illustrating one structural example of an electric vehicle according to a fifth embodiment of the present technology.
Figure 8A:
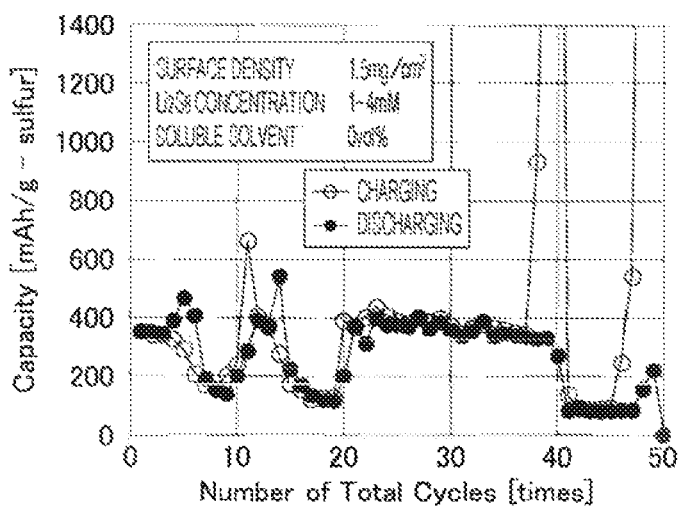
FIGS. 8A to 8C are diagrams illustrating cycle characteristics of coin cells in Comparative Example 1-1, Examples 1-2 and 1-3, respectively.
Figure 8B:
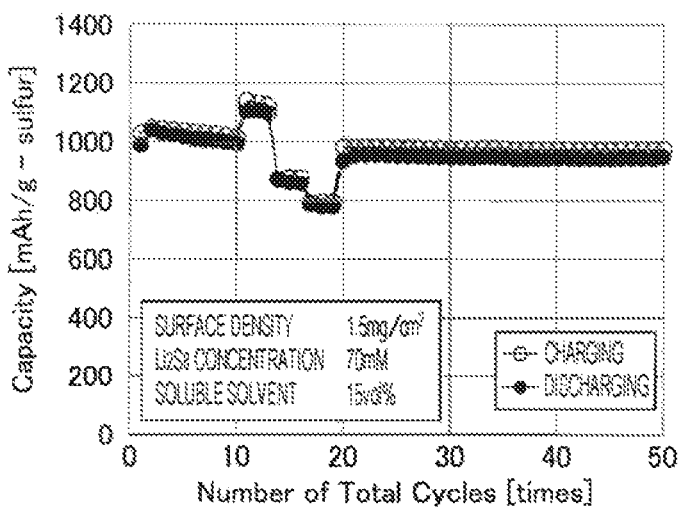
Figure 8C:
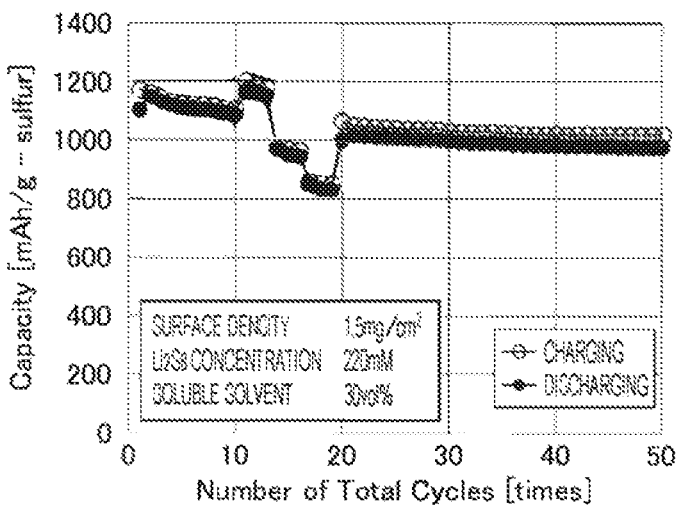

Hereinafter, one configuration of the electric vehicle according to the fifth embodiment of the present technology will be exemplified with reference to FIG. 7. A hybrid vehicle 200 is a hybrid vehicle using a series hybrid system. The series hybrid system is a car travelling with an electric power driving force converter 203 using electric power generated by a generator driven by an engine or electric power obtained by temporarily storing the generated electric power in a battery.

An engine 201, a generator 202, the electric power driving force converter 203, a driving wheel 204a, a driving wheel 204b, a wheel 205a, a wheel 205b, a battery 208, a vehicle control device 209, various sensors 210, and a charging port 211 are mounted in this hybrid vehicle 200. As the battery 208, the secondary battery according to the first or second embodiment is used.

The hybrid vehicle 200 travels using the electric power driving force converter 203 as a power source. An example of the electric power driving force converter 203 is a motor. The electric power driving force converter 203 acts by electric power of the battery 208, and a rotating force of the electric power driving force converter 203 is transmitted to the driving wheels 204a and 204b. Note that the electric power driving force converter 203 can be applied to both an AC motor and a DC motor by using DC-AC conversion or reverse conversion (AC-DC conversion) at necessary portions. The various sensors 210 control an engine speed through the vehicle control device 209, or control an opening degree (throttle opening degree) of a throttle valve (not illustrated). The various sensors 210 include a velocity sensor, an acceleration sensor, an engine speed sensor, and the like.

A rotating force of the engine 201 is transmitted to the generator 202, and electric power generated by the generator 202 can be stored in the battery 208 by the rotating force.

When the hybrid vehicle 200 is decelerated by a brake mechanism (not illustrated), a resistance force during the deceleration is added to the electric power driving force converter 203 as a rotating force, and regenerative electric power generated by the electric power driving force converter 203 due to this rotating force is stored in the battery 208.

By being connected to an external power source of the hybrid vehicle 200 through the charging port 211, the battery 208 receives electric power from the external power source by using the charging port 211 as an input port, and can store the received electric power.

Although not illustrated, an information processing device for performing information processing about vehicle control on the basis of information about a secondary battery may be included. Examples of such an information processing device include an information processing device for displaying a battery remaining amount on the basis of information about the battery remaining amount.

Note that the above description has been made by exemplifying a series hybrid car travelling with a motor using electric power generated by a generator driven by an engine or electric power obtained by temporarily storing the generated electric power in a battery. However, the present technology can be applied effectively also to a parallel hybrid car using both an engine and a motor as a driving source and appropriately switching three methods of travelling only by the engine, travelling only by the motor, and travelling by both the engine and the motor to be used. Furthermore, the present technology can be applied effectively also to a so-called electric vehicle travelling by driving only with a driving motor without use of an engine.

EXAMPLES

Hereinafter, the present technology will be described specifically with Examples, but the present technology is not limited only to the Examples.

The present Examples will be described in the following order.

i. Relationship between solubility of polysulfide-initial capacity and cycle characteristics
ii. The kind of dilution solvent
iii. The kind of ionic liquid i. Relationship Between Solubility of Polysulfide-Initial Capacity and Cycle Characteristics Examples 1-1 to 1-4 and Comparative Examples 1-1 to 1-4

A positive electrode was manufactured as follows. First, 60% by mass of insoluble sulfur as a positive electrode active material, 30% by mass of granular porous carbon (Ketjen Black KB-600JD manufactured by Lion Corporation), and 10% by mass of polyvinyl alcohol (PVA) as a binder were kneaded with N-methyl-2-pyrrolidone (NMP) to prepare a positive electrode mixture slurry. Subsequently, the prepared positive electrode mixture slurry was applied on an aluminum foil (positive electrode current collector)

having a thickness of 20 µm and was dried to form a positive electrode active material layer on the aluminum foil. A positive electrode was thereby obtained. Subsequently, the positive electrode was punched into a circle having a diameter of 15 mm and then was compressed with a press machine. A positive electrode having a positive electrode active material layer having a surface density of 1.5 mg/cm$^2$ and a thickness of 10 to 20 µm was thereby obtained.

An electrolytic solution was manufactured as follows. [Li(G4)$_1$][TFSI] as a liquid complex (glyme-Li complex), a DME-DOL mixed solvent as a soluble solvent (ether solvent), and 1H,1H,2'H,3H-decafluoro dipropyl ether (CAS number: 65064-78-0) as an insoluble solvent (fluorinated ether) were mixed at volume ratios (vol %) illustrated in Table 1 to prepare electrolytic solutions having different L$_2$S$_8$ solubilities, that is, different saturation sulfur concentrations (concentrations in terms of S$_8$). Note that, as the DME-DOL mixed solvent, a solvent obtained by mixing 1,2-dimethoxyethane (DME) and 1,3-dioxolane (DOL) at a weight ratio (w/w) of 1:1 was used. Note that in the above notation "(G4)$_1$", the lower right subscript of tetraglyme (G4) indicates an equivalent of tetraglyme with respect to LiTFSI.

By using the positive electrode and electrolytic solution, a 2016 size (diameter of 20 mm and height of 1.6 mm) coin type lithium sulfur battery (hereinafter, appropriately referred to as "coin cell") was manufactured as follows. First, a circular separator (20BMU manufactured by Tonen) having a diameter of 19 mm and a thickness of 20 µm was put on a circular lithium metal (negative electrode) having a diameter of 15.5 mm and a thickness of 800 µm, and then 40 µL of the above electrolytic solution was dropwise added to this separator.

Subsequently, a positive electrode was put on the separator to obtain a stacked body. Subsequently, this stacked body was housed in an exterior cup and an exterior can, and then outer peripheral portions of the exterior cup and the exterior can were caulked through a gasket. A target coin cell was thereby obtained.

(Evaluation of Initial Capacity and Cycle Characteristics)

A charge-discharge test was performed with respect to the coin cells obtained as described above in Examples 1-1 to 1-4 and Comparative Examples 1-1 to 1-4 under the following conditions to examine an initial capacity (initial discharge capacity) thereof and cycle characteristics thereof. Table 1 and FIGS. 8A to 8C, 9A, 9B, and 10 illustrate results thereof.

1.5V-3.3V constant current-constant voltage (CC-CV) (cut condition: 1/10 of set current value)

100 mA/cm$^2$ (10 cycles)→50 mA/cm$^2$ (3 cycles)→200 mA/cm$^2$ (3 cycles)→500 mA/cm$^2$ (3 cycles)→100 mA/cm$^2$ Note that the capacity retention ratio illustrated in Table 1 was determined by the following formula.

capacity retention ratio (%)=[(discharge capacity at the 50th cycle)/(discharge capacity at the second cycle)]×100

Table 1 illustrates configurations and evaluation results of the coin cells in Examples 1-1 to 1-4 and Comparative Examples 1-1 to 1-4.

TABLE 1

| | positive electrode surface density [mg/cm$^2$] | glyme-Li complex | soluble solvent | insoluble solvent | composition (volume ratio) | Li$_2$S$_8$ saturation sulfur concentration (in terms of S$_8$) [mM] | initial capacity [mAh/g] | capacity retention ratio (50 cycle) [%] |
|---|---|---|---|---|---|---|---|---|
| Example 1-1 | 1.5 | [Li(G4)$_1$]TFSI | DME, DOL | D2 | 30/5/65 | 10 | 770 | 85 |
| Example 1-2 | | [Li(G4)$_1$]TFSI | DME, DOL | D2 | 30/15/55 | 70 | 989 | 91 |
| Example 1-3 | | [Li(G4)$_1$]TFSI | DME, DOL | D2 | 25/30/45 | 220 | 1104 | 85 |
| Example 1-4 | | [Li(G4)$_1$]TFSI | DME, DOL | D2 | 28/40/32 | 400 | 1129 | 74 |
| Comparative Example 1-1 | | [Li(G4)$_1$]TFSI | — | D2 | 32/0/68 | 1-4 | 353 | termination without stable cycle |
| Comparative Example 1-2 | | [Li(G4)$_1$]TFSI | DME, DOL | D2 | 8/75/17 | 850 | 1088 | occurrence of charging failure |
| Comparative Example 1-3 | 0.5 | [Li(G4)$_1$]TFSI | — | D2 | 32/0/68 | 1-4 | 848 | 89 |
| Comparative Example 1-4 | 1.0 | [Li(G4)$_1$]TFSI | — | D2 | 32/0/68 | 1-4 | 756 | 90 |

G4: tetraglyme
TFSI: bis(trifluoromethanesulfonyl) imide
DME: 1,2-dimethoxyethane
DOL: 1,3-dioxolane
D2: 1,1,2,2-tetrafluoroethyl 2,2,3,3-tetrafluoropropyl ether The above evaluation results indicate the following.

In Comparative Examples 1-1, 1-3, and 1-4 in which the Li$_2$S$_8$ saturation sulfur concentration (concentration in terms of S$_8$) in the electrolytic solution is as low as 1 to 4 mM, as the surface density of the positive electrode is increased more in order to increase an energy density of a battery, the capacity is decreased more (refer to FIG. 10). In addition, when the surface density reaches 1.5 mg/cm$^2$, cycle characteristics are not stable (refer to FIGS. 8A and 10).

In Examples 1-1 to 1-4 in which the Li$_2$S$_8$ saturation sulfur concentration (concentration in terms of S$_8$) in the electrolytic solution is adjusted to 10 mM or more and 400 mM or less, even when the surface density of the positive electrode is increased to 1.5 mg/cm$^2$ in order to increase an energy density of a battery, a high capacity is obtained (refer to FIG. 10). In addition, even when the surface density is as high as 1.5 mg/cm$^2$, excellent cycle stability is obtained (refer to FIGS. 8B, 8C, 9A, and 10).

Figure 9A:
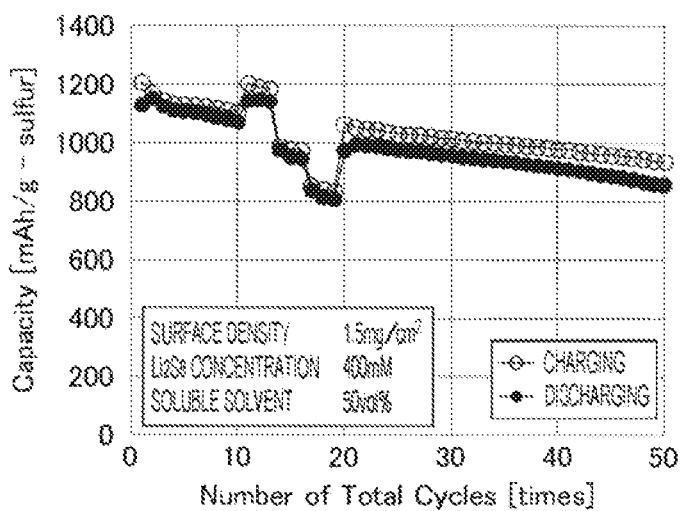
Figure 9B:
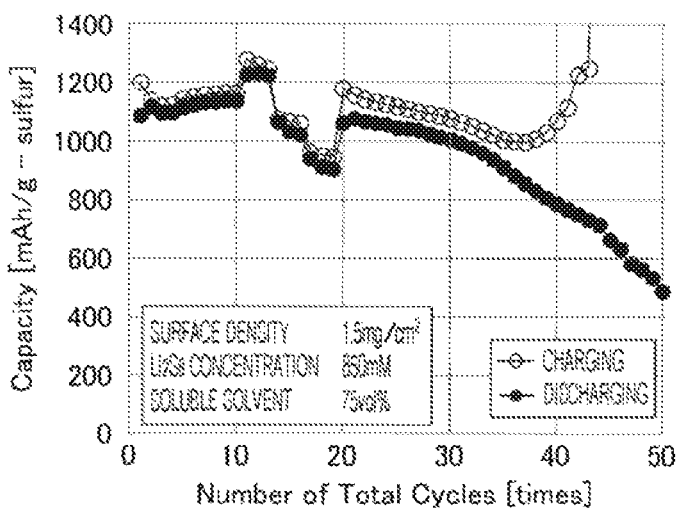

In Comparative Example 1-2 in which the Li$_2$S$_8$ saturation sulfur concentration (concentration in terms of S$_8$) in the electrolytic solution is more than 400 mM, a high capacity is obtained, but redox shuttle occurs and cycle stability is poor (refer to FIG. 9B).

Therefore, even when the positive electrode has a high density of 1.0 mg/cm² or more, by adjusting the composition of the electrolytic solution such that the $Li_2S_8$ saturation sulfur concentration (concentration in terms of $S_8$) in the electrolytic solution is 10 mM or more and 400 mM or less, a high capacity and excellent cycle stability are obtained.

By adjusting the composition of the electrolytic solution such that a volume ratio (A:B) between a sum A of a liquid complex (glyme-Li complex) and an insoluble solvent (fluorinated ether) and a soluble solvent (ether solvent) B is from 95:5 to 50:50, the $Li_2S_8$ saturation sulfur concentration (concentration in terms of $S_8$) in the electrolytic solution can be set to 10 mM or more and 400 mM or less. Therefore, even when the positive electrode has a high density, a high capacity and excellent cycle stability are obtained.

Note that, from the above results, when an electrolytic solution containing a liquid complex (glyme-Li complex) and a soluble solvent (ether solvent) is used, the following can be estimated for a volume ratio (C:B) between a liquid complex (glyme-Li complex) C and the soluble solvent (ether solvent) B. That is, by adjusting the composition of the electrolytic solution such that the volume ratio (C:B) is from 95:5 to 50:50, even when the positive electrode has a high density, a high capacity and excellent cycle stability are obtained as in the above case of the volume ratio (A:B).

ii. The Kind of Dilution Solvent

Examples 2-1 to 2-5

A coin cell was obtained in a similar manner to Example 1-1 except that the surface density of a positive electrode active material layer was 1.0 mg/cm² and an electrolytic solution prepared as follows was used. An electrolytic solution was prepared by mixing [Li(G4)₁][TFSI] as a liquid complex (glyme-Li complex) and an ether solvent or a sulfone solvent as a soluble solvent at a volume ratio (vol %) illustrated in Table 2. At this time, as illustrated in Table 2, 1,2-dimethoxyethane (DME), triglyme (G3), or tetraglyme (G4) was used as the ether solvent. In addition, As illustrated in Table 2, ethyl methyl sulfone (EMS) or sulfolane (SL) was used as the sulfone solvent.

Examples 2-6 to 2-9

A coin cell was obtained in a similar manner to Example 1-1 except that the surface density of a positive electrode active material layer was 1.0 mg/cm² and an electrolytic solution prepared as follows was used. An electrolytic solution was prepared by mixing [Li(G4)₁][TFSI] as a liquid complex (glyme-Li complex), an ether solvent or a sulfone solvent as a soluble solvent, and fluorinated ether or an aromatic compound as an insoluble solvent at a volume ratio (vol %) illustrated in Table 2. At this time, as illustrated in Table 2, tetraglyme (G4) was used as the ether solvent, and ethyl methyl sulfone (EMS) was used as the sulfone solvent. In addition, as illustrated in Table 2, 1,1,2,2-tetrafluoroethyl 2,2,3,3-tetrafluoropropyl ether (CAS number: 16627-68-2) or 1H, 1H, 2'H,3H-decafluoro dipropyl ether (CAS number: 65064-78-0) was used as the fluorinated ether, and toluene (TOL) or fluorobenzene (FBz) was used as the aromatic compound.

(Evaluation of Initial Capacity and Cycle Characteristics)

An initial capacity (initial discharge capacity) and cycle characteristics of each of the coin cells obtained as described above in Examples 2-1 to 2-9 were examined in a similar manner to Example 1-1. Table 2 illustrates results thereof.

Table 2 illustrates configurations and evaluation results of the coin cells in Examples 2-1 to 2-9.

TABLE 2

| | positive electrode surface density [mg/cm²] | glyme-Li complex | soluble solvent | insoluble solvent | composition (volume ratio) | $Li_2S_8$ saturation sulfur concentration (in terms of $S_8$) [mM] | initial capacity [mAh/g] | capacity retention ratio (50 cycle) [%] |
|---|---|---|---|---|---|---|---|---|
| Example 2-1 | 1.0 | [Li(G4)₁]TFSI | DME | — | 80/20/0 | 250 | 902 | 75 |
| Example 2-2 | | [Li(G4)₁]TFSI | G3 | — | 70/30/0 | 180 | 887 | 82 |
| Example 2-3 | | [Li(G4)₁]TFSI | G4 | — | 70/30/0 | 200 | 821 | 85 |
| Example 2-4 | | [Li(G4)₁]TFSI | EMS | — | 70/30/0 | 200 | 805 | 85 |
| Example 2-5 | | [Li(G4)₁]TFSI | SL | — | 70/30/0 | 230 | 772 | 87 |
| Example 2-6 | | [Li(G4)₁]TFSI | G4 | D1 | 30/15/55 | 50 | 856 | 90 |
| Example 2-7 | | [Li(G4)₁]TFSI | G4 | TOL | 30/15/55 | 60 | 873 | 85 |
| Example 2-8 | | [Li(G4)₁]TFSI | G4 | FBz | 30/15/55 | 60 | 890 | 86 |
| Example 2-9 | | [Li(G4)₁]TFSI | EMS | D2 | 30/15/55 | 50 | 899 | 87 |

TFSI: bis(trifluoromethanesulfonyl) imide
G3: triglyme
G4: tetraglyme
DME: 1,2-dimethoxyethane
EMS: ethyl methyl sulfone
SL: sulfolane
D1: 1H,1H,2'H,3H-decafluoro dipropyl ether
D2: 1,1,2,2-tetrafluoroethyl 2,2,3,3-tetrafluoropropyl ether
TOL: toluene
FBz: fluorobenzene The above evaluation results indicate the following.

Even when an ether solvent such as 1,2-dimethoxyethane (DME), triglyme (G3), or tetraglyme (G4) is used singly as a soluble solvent, by adjusting the composition of the electrolytic solution such that the $Li_2S_8$ saturation sulfur concentration (concentration in terms of $S_8$) in the electrolytic solution is 10 mM or more and 400 mM or less, even when the positive electrode has a high density, a high capacity and excellent cycle stability are obtained.

Also when a sulfone solvent such as ethyl methyl sulfone (EMS) or sulfolane (SL) is used singly as a soluble solvent, by setting the $Li_2S_8$ saturation sulfur concentration in the electrolytic solution to 10 mM or more and 400 mM or less, even when the positive electrode has a high density, a high capacity and excellent cycle stability are obtained.

Also when an electrolytic solution is diluted with an insoluble solvent such as fluorinated ether or an aromatic compound, by setting the $Li_2S_8$ saturation sulfur concentration in the electrolytic solution to 10 mM or more and 400 mM or less, even when the positive electrode has a high density, a high capacity and excellent cycle stability are obtained.

iii. The Kind of Ionic Liquid

Example 3-1

A coin cell was obtained in a similar manner to Example 1-1 except that the surface density of a positive electrode active material layer was 1.0 mg/cm$^2$ and an electrolytic solution prepared as follows was used. First, lithium bis (trifluoromethanesulfonyl) imide (LiTFSI) as a lithium salt was dissolved in N-methyl-N-propyl-piperidinium (PP13) as a liquid salt (ionic liquid) so as to obtain a concentration of 1M. Subsequently, PP13 in which LiTFSI was dissolved and 1,2-dimethoxyethane (DME) as a soluble solvent were mixed at a volume ratio (vol %) illustrated in Table 3 to prepare an electrolytic solution.

Example 3-2

A coin cell was obtained in a similar manner to Example 3-1 except that PP13 in which LiTFSI was dissolved, 1,2-dimethoxyethane (DME), and 1H, 1H,2'H, 3H-decafluoro dipropyl ether (CAS number: 65064-78-0) as an insoluble solvent were mixed at a volume ratio (vol %) illustrated in Table 3 to prepare an electrolytic solution.

Examples 3-3 and 3-4

A coin cell was obtained in a similar manner to Examples 3-1 and 3-2 except that N-methyl-N-propyl-pyrrolidinium (P13) was used in place of N-methyl-N-propyl-piperidinium (PP13) as a liquid salt (ionic liquid).

Comparative Example 3-1

A coin cell was obtained in a similar manner to Example 3-1 except that a volume ratio (vol %) between PP13 in which LiTFSI was dissolved and 1,2-dimethoxyethane (DME) was changed as illustrated in Table 3.

Comparative Example 3-2

A coin cell was obtained in a similar manner to Example 3-2 except that a volume ratio (vol %) between P13 in which LiTFSI was dissolved and 1,2-dimethoxyethane (DME) was changed as illustrated in Table 3.

(Evaluation of Initial Capacity and Cycle Characteristics)

An initial capacity (initial discharge capacity) and cycle characteristics of each of the coin cells obtained as described above in Examples 3-1 to 3-4 and Comparative Examples 3-1 and 3-2 were examined in a similar manner to Example 1-1. Table 3 illustrates results thereof.

Table 3 illustrates configurations and evaluation results of the coin cells in Examples 3-1 to 3-4 and Comparative Examples 3-1 and 3-2.

TABLE 3

| | positive electrode surface density [mg/cm$^2$] | ionic liquid (Li salt is added) | solvent having high solubility | insoluble solvent | composition (volume ratio) | $Li_2S_8$ saturation sulfur concentration (in terms of $S_8$) [mM] | initial capacity [mAh/g] | capacity retention ratio (50 cycle) [%] |
|---|---|---|---|---|---|---|---|---|
| Example 3-1 | 1.0 | PP13, LiTFSI | DME | — | 80/20/0 | 220 | 799 | 80 |
| Example 3-2 | | PP13, LiTFSI | DME | D2 | 30/15/55 | 100 | 853 | 86 |
| Example 3-3 | | P13, LiTFSI | DME | — | 80/20/0 | 300 | 824 | 74 |
| Example 3-4 | | P13, LiTFSI | DME | D2 | 30/15/55 | 120 | 871 | 79 |
| Comparative Example 3-1 | | PP13, LiTFSI | DME | — | 70/30/0 | 450 | 810 | occurrence of charging failure |
| Comparative Example 3-2 | | P13, LiTFSI | DME | — | 70/30/0 | 600 | 730 | occurrence of charging failure |

PP13: N-methyl-N-propyl-piperidinium
P13: N-methyl-N-propyl-pyrrolidinium
LiTFSI: lithium bis(trifluoromethanesulfonyl) imide
DME: 1,2-dimethoxyethane
D2: 1,1,2,2-tetrafluoroethyl 2,2,3,3-tetrafluoropropyl ether The above evaluation results indicate the following.

Even when a liquid salt (ionic liquid) is used as a component of an electrolytic solution, as in the case of using a liquid complex (glyme-Li complex) as a component of an electrolytic solution, by adjusting the composition of the electrolytic solution such that the $Li_2S_8$ saturation sulfur concentration (concentration in terms of $S_8$) in the electrolytic solution is 10 mM or more and 400 mM or less, even when the positive electrode has a high density, a high capacity and excellent cycle stability are obtained.

Hereinabove, embodiments of the present technology have been described specifically. However, the present technology is not limited to the above embodiments, but various modifications can be made on the basis of a technical idea of the present technology.

For example, the configurations, the methods, the processes, the forms, the materials, the numerical values, and the like exemplified in the above embodiments are only examples, and a configuration, a method, a process, a form, a material, a numerical value, and the like different therefrom may be used, as necessary.

In addition, the configurations, the methods, the processes, the forms, the materials, the numerical values, and the like in the above embodiments can be combined to each other as long as not departing from the gist of the present technology.

In addition, in the above embodiments, an example in which the present technology has been applied to a battery having a wound structure has been described. However, the structure of the battery is not limited thereto, but the present technology can be applied to a battery having a structure in which a positive electrode and a negative electrode are folded or stacked.

In addition, in the above embodiments, an example in which the present technology is applied to a cylinder type battery or a flat type battery has been described. However, the shape of the battery is not limited thereto, but the present technology can be applied to a coin type battery, a button type battery, a square type battery, or the like.

In addition, in the above embodiments, the configuration in which a positive electrode includes a positive electrode current collector and a positive electrode active material layer has been exemplified. However, the configuration of the positive electrode is not limited thereto. For example, the positive electrode may be formed only of a positive electrode active material layer.

In addition, the present technology can use the following configurations.

(1)
A battery including:
a positive electrode containing sulfur;
a negative electrode containing a material for occluding and releasing a lithium ion; and
an electrolytic solution, in which
the electrolytic solution contains:
at least one of a liquid complex and a liquid salt in which a polysulfide is insoluble or almost insoluble; and
a solvent in which a polysulfide is soluble, and
the electrolytic solution has a $Li_2S_8$ saturation sulfur concentration of 10 mM or more and 400 mM or less.

(2)
The battery according to (1), in which the electrolytic solution further contains another solvent in which a polysulfide is insoluble or almost insoluble.

(3)
The battery according to (1) or (2), in which the liquid complex is a glyme-lithium salt complex, and the liquid salt is an ionic liquid.

(4)
The battery according to any one of (1) to (3), in which the solvent contains at least one of an ether solvent and a sulfone solvent.

(5)
The battery according to any one of (1) to (4), in which a volume ratio between at least one of the liquid complex and the liquid salt and the solvent [(at least one of the liquid complex and the liquid salt):(the solvent)] is from 95:5 to 50:50.

(6)
The battery according to any one of (1) to (5), in which the $Li_2S_8$ saturation sulfur concentration of the liquid complex and the liquid salt is 10 mM or less, and the $Li_2S_8$ saturation sulfur concentration of the solvent in which a Li salt is dissolved is 400 mM or more.

(7)
The battery according to (2), in which the other solvent contains at least one of fluorinated ether and an aromatic compound.

(8)
The battery according to (2) or (7), in which the $Li_2S_8$ saturation sulfur concentration of the other solvent is 10 mM or less.

(9)
The battery according to (2), (7), or (8), in which a volume ratio between at least one of the liquid complex and the liquid salt and the other solvent, and the solvent [(at least one of the liquid complex and the liquid salt and the other solvent):(the solvent)] is from 95:5 to 50:50.

(10)
The battery according to any one of (1) to (9), in which the positive electrode has a surface density of 1.0 mg/cm$^2$ or more.

(11)
An electrolytic solution containing:
at least one of a liquid complex and a liquid salt in which a polysulfide is insoluble or almost insoluble; and
a solvent in which a polysulfide is soluble, in which the electrolytic solution has a $Li_2S_8$ saturation sulfur concentration of 10 mM or more and 400 mM or less.

(12)
A battery pack including a battery including:
a positive electrode containing sulfur;
a negative electrode containing a material for occluding and releasing a lithium ion; and
an electrolytic solution, in which
the electrolytic solution contains:
at least one of a liquid complex and a liquid salt in which a polysulfide is insoluble or almost insoluble; and
a solvent in which a polysulfide is soluble, and
the electrolytic solution has a $Li_2S_8$ saturation sulfur concentration of 10 mM or more and 400 mM or less.

(13)
An electronic device including a battery including:
a positive electrode containing sulfur;
a negative electrode containing a material for occluding and releasing a lithium ion; and
an electrolytic solution, in which
the electrolytic solution contains:
at least one of a liquid complex and a liquid salt in which a polysulfide is insoluble or almost insoluble; and
a solvent in which a polysulfide is soluble,
the electrolytic solution has a $Li_2S_8$ saturation sulfur concentration of 10 mM or more and 400 mM or less, and
the electronic device receives electric power from the battery.

(14)
An electric vehicle including:
a battery;
a converter for converting electric power supplied from the battery into a driving force of the vehicle; and
a control device for performing information processing on vehicle control on the basis of information on the battery, in which
the battery includes:
a positive electrode containing sulfur;
a negative electrode containing a material for occluding and releasing a lithium ion; and
an electrolytic solution,
the electrolytic solution contains:
at least one of a liquid complex and a liquid salt in which a polysulfide is insoluble or almost insoluble; and a solvent in which a polysulfide is soluble, and the electrolytic solution has a $Li_2S_8$ saturation sulfur concentration of 10 mM or more and 400 mM or less.

(15)

An electricity storage device including a battery including:

a positive electrode containing sulfur;

a negative electrode containing a material for occluding and releasing a lithium ion; and an electrolytic solution, in which the electrolytic solution contains:

at least one of a liquid complex and a liquid salt in which a polysulfide is insoluble or almost insoluble; and a solvent in which a polysulfide is soluble, the electrolytic solution has a $Li_2S_8$ saturation sulfur concentration of 10 mM or more and 400 mM or less, and the electricity storage device supplies electric power to an electronic device connected to the battery.

(16)

The electricity storage device according to (15), including an electric power information control device for transmitting a signal to or receiving a signal from another device via a network, in which the electricity storage device performs charge-discharge control of the battery on the basis of information received by the electric power information control device.

(17)

An electric power system including a battery including:

a positive electrode containing sulfur;

a negative electrode containing a material for occluding and releasing a lithium ion; and an electrolytic solution, in which the electrolytic solution contains:

at least one of a liquid complex and a liquid salt in which a polysulfide is insoluble or almost insoluble; and a solvent in which a polysulfide is soluble, the electrolytic solution has a $Li_2S_8$ saturation sulfur concentration of 10 mM or more and 400 mM or less, and the electric power system receives electric power from the battery or electric power is supplied from a power generating device or an electric power network to the battery.

REFERENCE SIGNS LIST 11 battery can
12, 13 insulating plate
14 battery lid
15 safety valve mechanism
15A disk plate
16 positive temperature coefficient element
17 gasket
20, 30 wound electrode body
21, 33 positive electrode
21A, 33A positive electrode current collector
21B, 33B positive electrode active material layer
22, 34 negative electrode
22A, 34A negative electrode current collector
22B, 34B negative electrode active material layer
23, 35 separator
24 center pin
25, 31 positive electrode lead
26, 32 negative electrode lead
36 electrolyte layer
37 protective tape
40 exterior member
41 adhesive film

The invention claimed is:

1. A battery, comprising:
   a positive electrode containing sulfur;
   a negative electrode containing a material for occluding and releasing a lithium ion; and
   an electrolytic solution, wherein the electrolytic solution contains:
      a liquid complex in which a polysulfide is insoluble, wherein the liquid complex is a glyme-lithium salt complex; and
      a sulfone solvent in which the polysulfide is soluble, wherein the sulfone solvent is ethyl methyl sulfone (EMS), and
      an other solvent in which the polysulfide is insoluble, wherein the other solvent contains hydrofluoroether (HFE),
   wherein the electrolytic solution has a $Li_2S_8$ saturation sulfur concentration of 10 mM or more and 400 mM or less.

2. The battery according to claim 1, wherein the electrolytic solution further contains an ether solvent in which the polysulfide is soluble.

3. The battery according to claim 1, wherein a volume ratio between the liquid complex and the sulfone solvent [(the liquid complex):(the sulfone solvent)] is from 95:5 to 50:50.

4. The battery according to claim 1, wherein
   the $Li_2S_8$ saturation sulfur concentration of the liquid complex is 10 mM or less, and
   the $Li_2S_8$ saturation sulfur concentration of the sulfone solvent is 400 mM or more.

5. The battery according to claim 1, wherein the $Li_2S_8$ saturation sulfur concentration of the other solvent is 10 mM or less.

6. The battery according to claim 1, wherein a volume ratio between the liquid complex and the other solvent, and the sulfone solvent [(the liquid complex and the other solvent):(the sulfone solvent)] is from 95:5 to 50:50.

7. The battery according to claim 1, wherein the positive electrode has a surface density of 1.0 mg/cm$^2$ or more.

8. The battery according to claim 1, further comprising a separator, wherein
   the separator includes a monolayer of a porous film, and
   the porous film comprises a synthetic resin.

* * * * *